(12) United States Patent
Choi et al.

(10) Patent No.: US 11,795,607 B2
(45) Date of Patent: Oct. 24, 2023

(54) CLOTHING MANAGEMENT DEVICE FOR VEHICLE

(71) Applicant: LG Electronics Inc., Seoul (KR)

(72) Inventors: Dongkyu Choi, Seoul (KR); Namyoung Kim, Seoul (KR); Changon Lee, Seoul (KR); Yeona Jo, Seoul (KR); Hongmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 17/090,512

(22) Filed: Nov. 5, 2020

(65) Prior Publication Data

US 2021/0172110 A1    Jun. 10, 2021

Related U.S. Application Data

(60) Provisional application No. 62/944,035, filed on Dec. 5, 2019.

(30) Foreign Application Priority Data

Jan. 3, 2020    (KR) .................. 10-2020-0000848

(51) Int. Cl.
*D06F 58/10*    (2006.01)
*B60W 60/00*    (2020.01)

(52) U.S. Cl.
CPC ......... *D06F 58/10* (2013.01); *B60W 60/0013* (2020.02)

(58) Field of Classification Search
CPC .......... D06F 58/10; D06F 58/38; D06F 34/18; D06F 2103/06; D06F 2105/16; B60W 60/0013
USPC ........................................... 34/218
See application file for complete search history.

(56) References Cited

U.S. PATENT DOCUMENTS

| 749,120 | A | * | 1/1904 | Weir | ............... | A47F 3/00 |
| | | | | | | 312/302 |
| 2017/0107659 | A1 | * | 4/2017 | Hills | ............... | D06F 73/02 |
| 2017/0342651 | A1 | * | 11/2017 | Choi | ............... | D06F 58/44 |

FOREIGN PATENT DOCUMENTS

JP    H11188198 A    * 12/1997

* cited by examiner

*Primary Examiner* — John P McCormack
(74) *Attorney, Agent, or Firm* — Fish & Richardson P.C.

(57) ABSTRACT

A clothing management device for a vehicle includes: a main body provided in the vehicle and defining a storage space configured to receive clothing, a door connected to the main body and configured to open and close the storage space, a vibration generator provided in the main body and configured to generate a vibration that is transferred to the clothing in the main body, and a power interface configured to transfer a power from the vehicle to the vibration generator.

20 Claims, 19 Drawing Sheets

FIG. 1
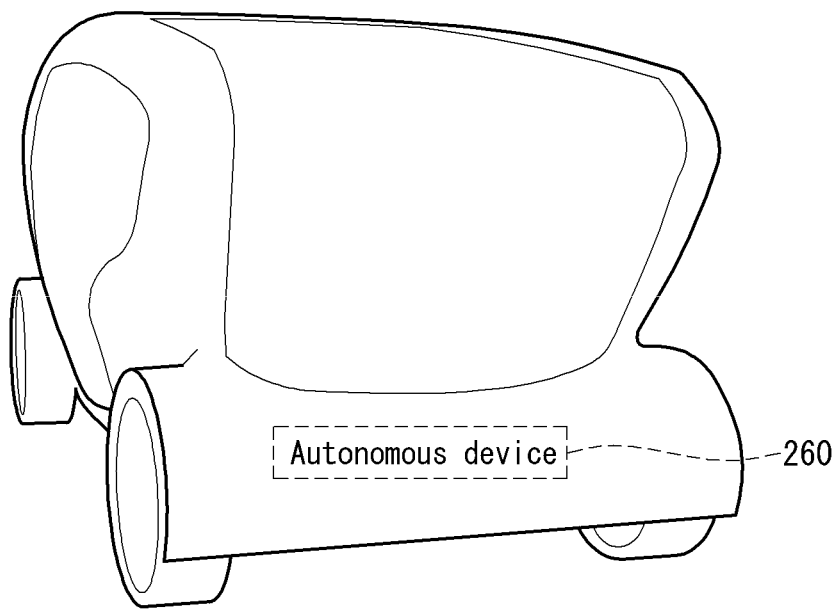
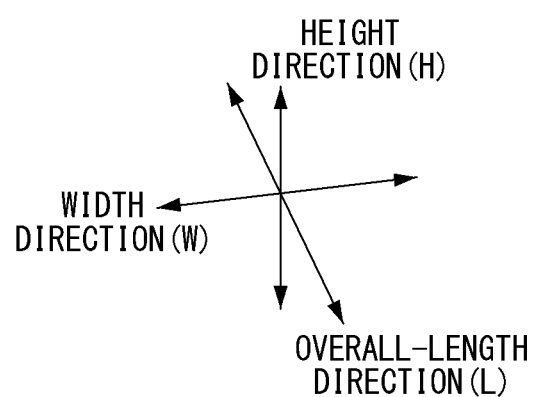

CLOTHING MANAGEMENT DEVICE FOR VEHICLE

The present application claims the benefit of an earlier filing date and right of priority to U.S. Provisional Application No. 62/944,035, filed on Dec. 5, 2019, and the present application claims priority under 35 U.S.C. 119 to Korean Patent Application No. 10-2020-0000848, filed on Jan. 3, 2020, the contents of which are hereby incorporated by reference in their entirety.

TECHNICAL FIELD

The present disclosure relates to a clothing management device for vehicle.

BACKGROUND

An autonomous vehicle refers to a vehicle that can drive by itself without operation by a driver or a passenger, and an automated vehicle & highway system refers to a system that monitors and controls such an autonomous vehicle to be able to drive by itself.

Users using autonomous vehicles are demanding various services. In particular, users who are active outside and board the vehicle want to manage clothing for a time until the next destination. However, it is not technically easy to provide a clothing management device for meeting this demand in the vehicle. This is because there is a limit to receiving power from the autonomous vehicle.

Accordingly, there is an increasing need for a clothing management device for vehicle that can provide clothing management service that is sufficiently satisfactory for the users by using limited power inside the vehicle.

SUMMARY

An object of the present disclosure is to provide a clothing management device for vehicle for managing clothing of users who board autonomous vehicles.

Another object of the present disclosure is to provide clothing management service by utilizing a boarding time of users who board autonomous vehicles.

Another object of the present disclosure is to manage clothing by utilizing all vibrations generated in a vibration motor of a clothing management device as well as vibrations generated during the driving of an autonomous vehicle.

Another object of the present disclosure is to provide a clothing management device for vehicle that is most efficient with the minimal power because the clothing management device uses power of an autonomous vehicle.

Another object of the present disclosure is to maintain clothing of users boarding autonomous vehicles in a comfortable state using a hot air blower, etc.

Technical problems to be solved by the present disclosure are not limited by the above-mentioned technical problems, and other technical problems which are not mentioned above can be clearly understood from the following description by those skilled in the art to which the present disclosure pertains.

To achieve the above-described and other objects, in one aspect, there is provided a clothing management device for vehicle comprising a main body provided in the vehicle and configured to store clothing, a door configured to open and close the main body, a vibration generator provided in the main body and configured to generate a vibration in the clothing stored in the main body, and a power interface configured to transfer a power of the vehicle to the vibration generator.

The main body may include a fixed rail that is formed on one surface inside the main body and is extended from an entrance of the main body to an inside of the main body. The door may slidingly move along the fixed rail.

The clothing management device for vehicle may further comprise a hanging portion for storing the clothing in the main body.

The door may include a door arm that is fastened to the hanging portion and transfers the vibration generated by the vibration generator to the hanging portion.

The vibration generator may include a vibration motor configured to generate the vibration, and a transfer member connected to the vibration motor and configured to transfer the vibration generated by the vibration motor to the door arm.

The hanging portion may include a fastening portion attached to and detached from the door arm, and a support portion that is connected to the fastening portion and supports the clothing.

The fastening portion may include a magnetic material, and the support portion may include an electromagnet. The support portion may receive the power of the vehicle from the power interface and transfer the power to the electromagnet. In addition, the support portion may be fastened to the fastening portion using magnetism of the electromagnet.

The support portion may generate a flow of air inside the clothing.

The support portion may include an internal fan, an exhaust port configured to exhaust an internal air of the support portion by a power of the internal fan, and an intake port configured to introduce an outside air of the support portion in response to the exhaust.

The exhaust port may be positioned on a lower surface of the support portion, and may exhaust the internal air of the support portion toward a lower end of the clothing.

The vibration generator may vibrate in a first direction.

The main body may further include a slider that is connected to the fixed rail and slidingly moves. The door may be connected to the slider and may slidingly move along the fixed rail.

The clothing management device for vehicle may further comprise a hot air blower provided in the main body and configured to dry the clothing.

The clothing management device for vehicle may further comprise a sensing unit configured to sense a type of fibers constituting the clothing, and a controller configured to adjust the hot air blower according to the sensed type of fibers.

The clothing management device for vehicle may further comprise a guide portion that is connected to one end of the door and prevents the clothing hanging on the hanging portion from coming off.

The clothing management device for vehicle may further comprise a sensing unit configured to sense a type of fibers constituting the clothing. The sensing unit may be positioned on an inner surface of the guide portion.

The vehicle may include a first seat and a second seat that are arranged side by side. The main body may be positioned between the first seat and the second seat.

A bottom of the vehicle may include a trench, and the main body may be installed in the trench.

A height of the main body may be greater than a depth of the trench.

The main body may include a hydraulic cylinder that provides a pressure for opening and closing the door.

The present disclosure has an effect of providing a clothing management device for vehicle for managing clothing of users who board autonomous vehicles.

The present disclosure has an effect of providing clothing management service by utilizing a boarding time of users who board autonomous vehicles.

The present disclosure has an effect of managing e clothing by utilizing all vibrations generated in a vibration motor of a clothing management device as well as vibrations generated during the driving of an autonomous vehicle.

The present disclosure has an effect of providing a clothing management device for vehicle that is most efficient with the minimal power because the clothing management device uses power of an autonomous vehicle.

The present disclosure has an effect of maintaining clothing of users boarding autonomous vehicles in a comfortable state using a hot air blower, etc.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompanying drawings, which are included as part of the detailed description to assist understanding of the disclosure, illustrate embodiments of the disclosure and explain the technical features of the disclosure together with the detailed description.

FIG. 1 illustrates a vehicle according to an embodiment of the present disclosure.

DETAILED DESCRIPTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Driving (1) Exterior of Vehicle

FIG. 1 is a diagram showing a vehicle according to an embodiment of the present disclosure.

Referring to FIG. 1, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 2:
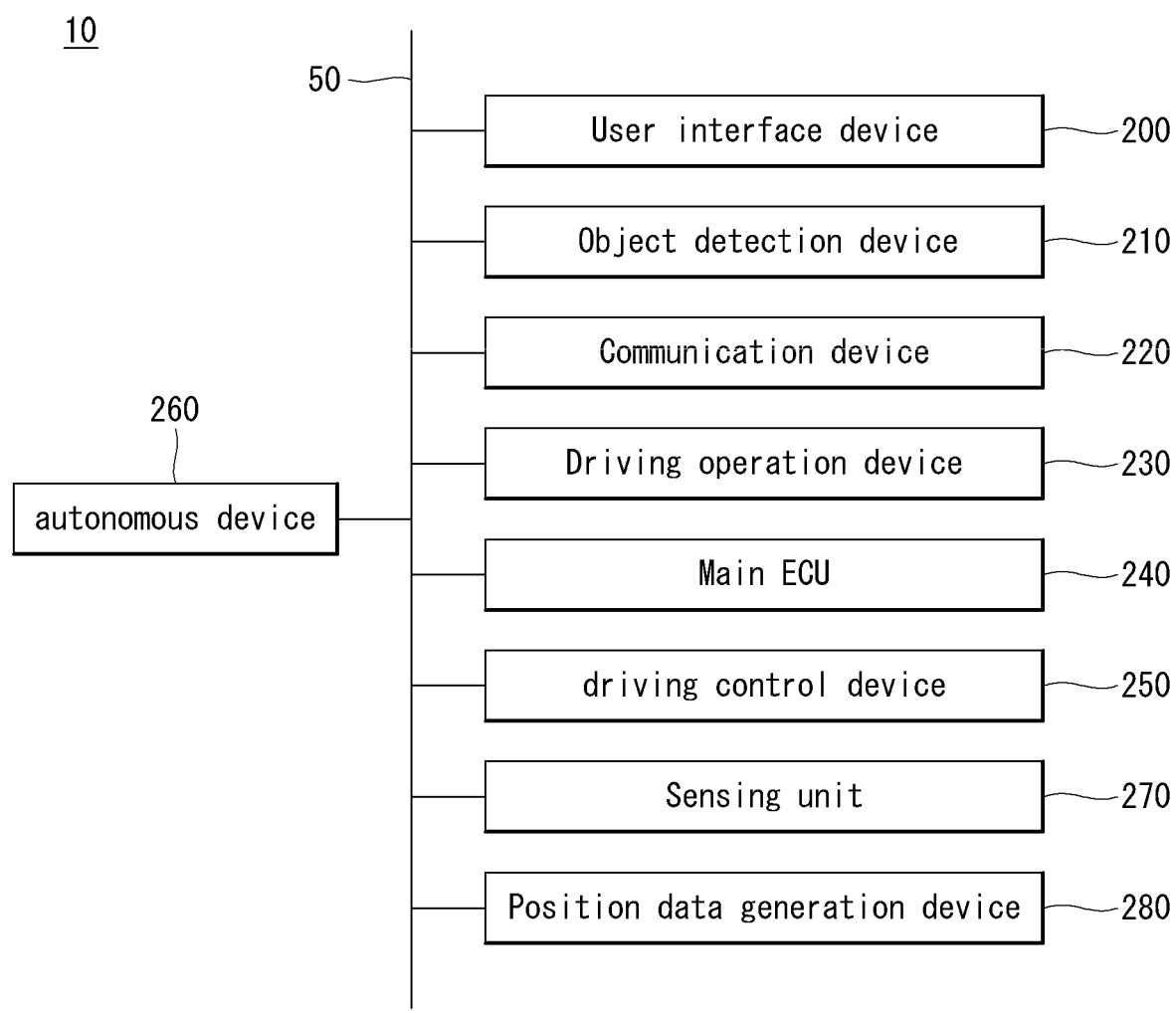
FIG. 2 is a control block diagram of the vehicle according to an embodiment of the present disclosure.

FIG. 2 is a control block diagram of the vehicle according to an embodiment of the present disclosure.

Referring to FIG. 2, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

The communication device 220 may exchange signals with an external device through vehicle-to-everything (V2X) communication technology. V2X communication may be provided via PC5 interface and/or Uu interface.

The next generation radio access technology may be referred to as a new radio access technology (RAT) or a new radio (NR). The V2X communication may also be supported in NR.

5G NR is a subsequent technology of LTE-A, and is a new clean-slate mobile communication system having characteristics such as high performance, low latency, and high availability. The 5G NR can utilize all available spectrum resources in low frequency bands below 1 GHz, mid-frequency bands from 1 GHz to 10 GHz, and high frequency bands above 24 GHz (millimeter wave), etc.

For the clear description, embodiments of the present disclosure are described focusing on LTE-A or 5G NR, but the technical spirit of the present disclosure is not limited thereto.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

Figure 3:
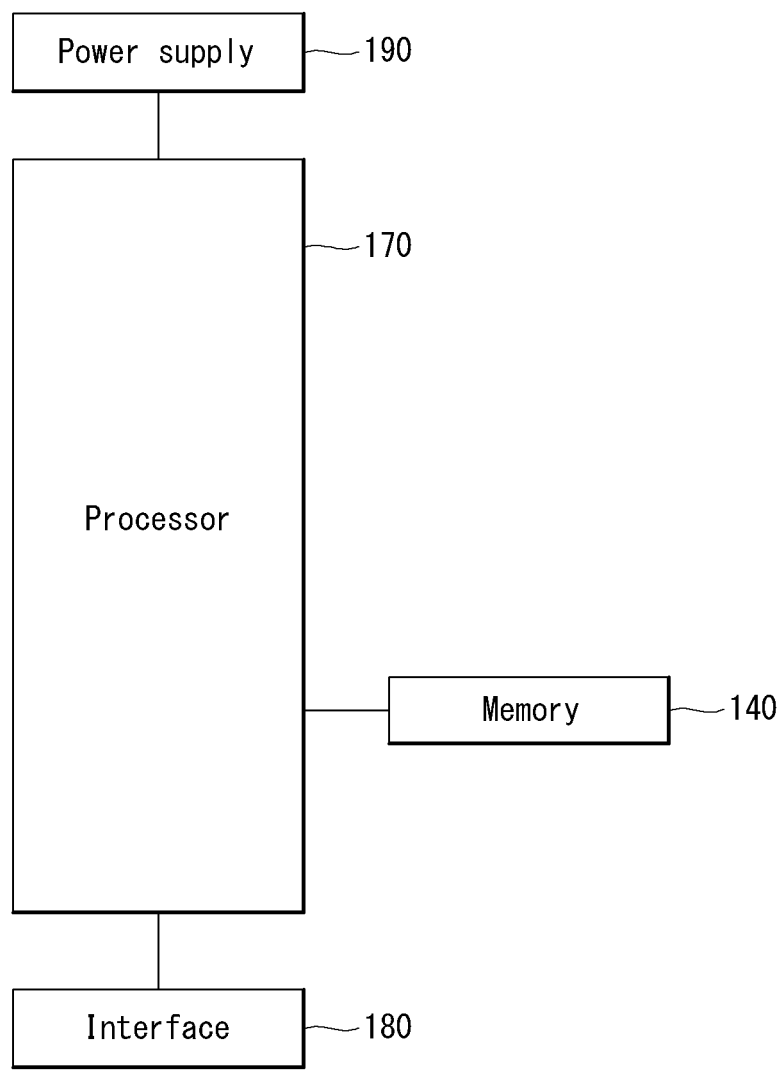
FIG. 3 is a control block diagram of an autonomous device according to an embodiment of the present disclosure.

FIG. 3 is a control block diagram of the autonomous device according to an embodiment of the present disclosure.

Referring to FIG. 3, the autonomous device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

Figure 4:
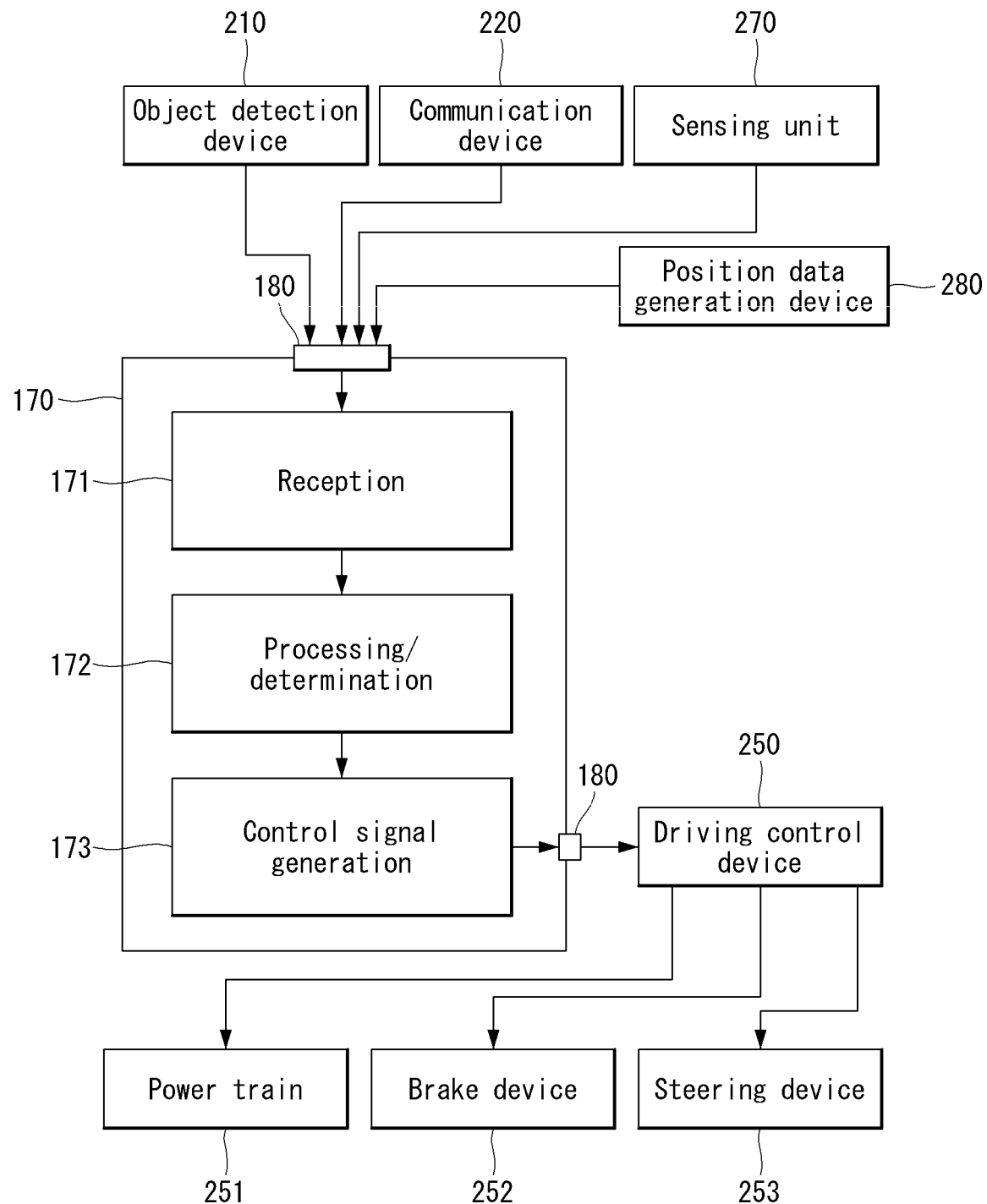
FIG. 4 is a diagram showing a signal flow in an autonomous vehicle according to an embodiment of the present disclosure.

FIG. 4 is a diagram showing a signal flow in an autonomous vehicle according to an embodiment of the present disclosure.

1) Reception Operation

Referring to FIG. 4, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

Cabin

Figure 5:
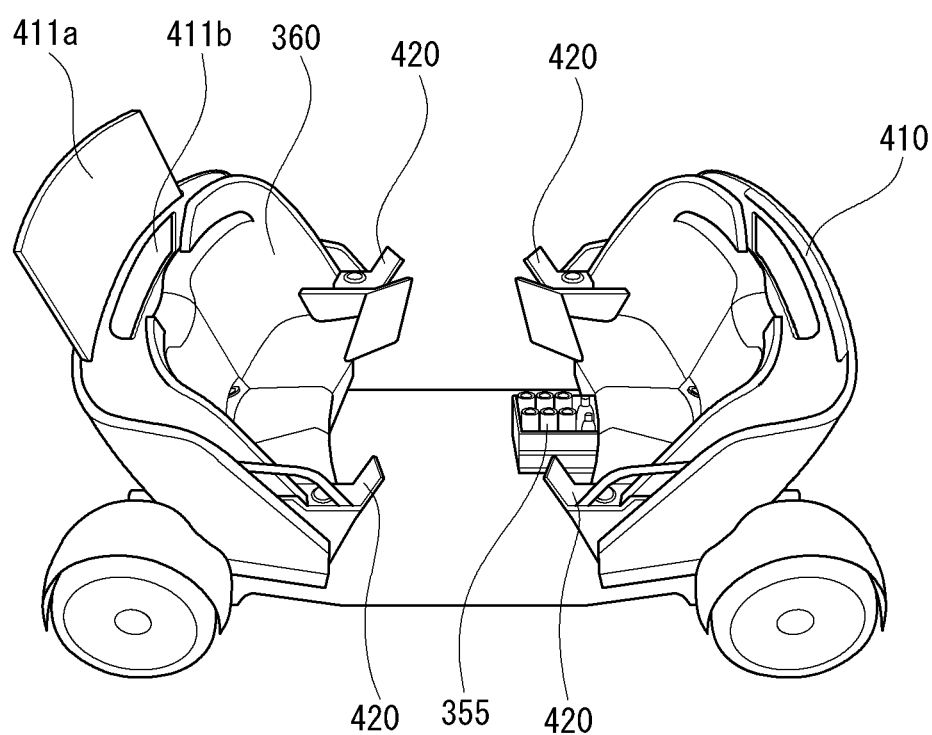
FIG. 5 is a diagram illustrating the interior of a vehicle according to an embodiment of the present disclosure.
Figure 6:
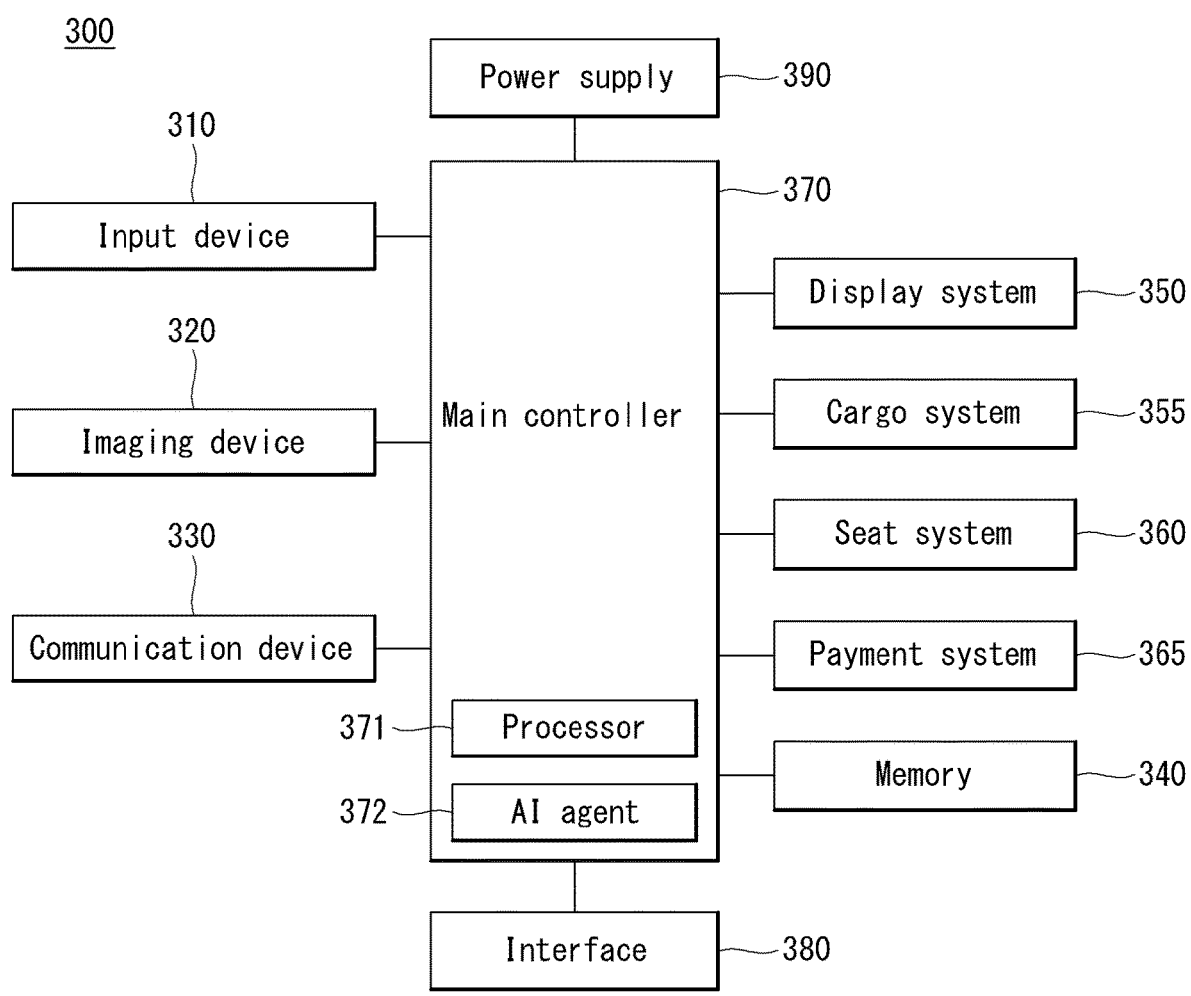
FIG. 6 is a block diagram referred to in description of a cabin system for a vehicle according to an embodiment of the present disclosure.

FIG. 5 is a diagram showing the interior of the vehicle according to an embodiment of the present disclosure. FIG. 6 is a block diagram referred to in description of a cabin system for a vehicle according to an embodiment of the present disclosure.

(1) Components of Cabin

Referring to FIGS. 5 and 6, a cabin system 300 for a vehicle (hereinafter, a cabin system) can be defined as a convenience system for a user who uses the vehicle 10. The cabin system 300 can be explained as a high-end system including a display system 350, a cargo system 355, a seat system 360 and a payment system 365. The cabin system 300 may include a main controller 370, a memory 340, an interface 380, a power supply 390, an input device 310, an imaging device 320, a communication device 330, the display system 350, the cargo system 355, the seat system 360 and the payment system 365. The cabin system 300 may further include components in addition to the components described in this specification or may not include some of the components described in this specification according to embodiments.

1) Main Controller

The main controller 370 can be electrically connected to the input device 310, the communication device 330, the display system 350, the cargo system 355, the seat system 360 and the payment system 365 and exchange signals with these components. The main controller 370 can control the input device 310, the communication device 330, the display system 350, the cargo system 355, the seat system 360 and the payment system 365. The main controller 370 may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may be configured as at least one sub-controller. The main controller 370 may include a plurality of sub-controllers according to an embodiment. The plurality of sub-controllers may individually control the devices and systems included in the cabin system 300. The devices and systems included in the cabin system 300 may be grouped by function or grouped on the basis of seats on which a user can sit.

The main controller 370 may include at least one processor 371. Although FIG. 6 illustrates the main controller 370 including a single processor 371, the main controller 370 may include a plurality of processors. The processor 371 may be categorized as one of the above-described sub-controllers.

The processor 371 can receive signals, information or data from a user terminal through the communication device 330. The user terminal can transmit signals, information or data to the cabin system 300.

The processor 371 can identify a user on the basis of image data received from at least one of an internal camera and an external camera included in the imaging device. The processor 371 can identify a user by applying an image processing algorithm to the image data. For example, the processor 371 may identify a user by comparing information received from the user terminal with the image data. For example, the information may include at least one of route information, body information, fellow passenger information, baggage information, position information, preferred content information, preferred food information, disability information and use history information of a user.

The main controller 370 may include an artificial intelligence (AI) agent 372. The AI agent 372 can perform machine learning on the basis of data acquired through the input device 310. The AI agent 372 can control at least one of the display system 350, the cargo system 355, the seat system 360 and the payment system 365 on the basis of machine learning results.

2) Essential Components

The memory 340 is electrically connected to the main controller 370. The memory 340 can store basic data about units, control data for operation control of units, and input/output data. The memory 340 can store data processed in the main controller 370. Hardware-wise, the memory 340 may be configured using at least one of a ROM, a RAM, an EPROM, a flash drive and a hard drive. The memory 340 can store various types of data for the overall operation of the cabin system 300, such as a program for processing or control of the main controller 370. The memory 340 may be integrated with the main controller 370.

The interface 380 can exchange signals with at least one electronic device included in the vehicle 10 in a wired or wireless manner. The interface 380 may be configured using at least one of a communication module, a terminal, a pin, a cable, a port, a circuit, an element and a device.

The power supply 390 can provide power to the cabin system 300. The power supply 390 can be provided with power from a power source (e.g., a battery) included in the vehicle 10 and supply the power to each unit of the cabin system 300. The power supply 390 can operate according to a control signal supplied from the main controller 370. For example, the power supply 390 may be implemented as a switched-mode power supply (SMPS).

The cabin system 300 may include at least one printed circuit board (PCB). The main controller 370, the memory 340, the interface 380 and the power supply 390 may be mounted on at least one PCB.

3) Input Device

The input device 310 can receive a user input. The input device 310 can convert the user input into an electrical signal. The electrical signal converted by the input device 310 can be converted into a control signal and provided to at least one of the display system 350, the cargo system 355, the seat system 360 and the payment system 365. The main controller 370 or at least one processor included in the cabin system 300 can generate a control signal based on an electrical signal received from the input device 310.

The input device 310 may include at least one of a touch input unit, a gesture input unit, a mechanical input unit and a voice input unit. The touch input unit can convert a user's touch input into an electrical signal. The touch input unit may include at least one touch sensor for detecting a user's touch input. According to an embodiment, the touch input unit can realize a touch screen by integrating with at least one display included in the display system 350. Such a touch screen can provide both an input interface and an output interface between the cabin system 300 and a user. The gesture input unit can convert a user's gesture input into an electrical signal. The gesture input unit may include at least one of an infrared sensor and an image sensor for detecting a user's gesture input. According to an embodiment, the gesture input unit can detect a user's three-dimensional gesture input. To this end, the gesture input unit may include a plurality of light output units for outputting infrared light or a plurality of image sensors. The gesture input unit may detect a user's three-dimensional gesture input using TOF (Time of Flight), structured light or disparity. The mechanical input unit can convert a user's physical input (e.g., press or rotation) through a mechanical device into an electrical signal. The mechanical input unit may include at least one of a button, a dome switch, a jog wheel and a jog switch. Meanwhile, the gesture input unit and the mechanical input unit may be integrated. For example, the input device 310 may include a jog dial device that includes a gesture sensor and is formed such that it can be inserted/ejected into/from a part of a surrounding structure (e.g., at least one of a seat, an armrest and a door). When the jog dial device is parallel to the surrounding structure, the jog dial device can serve as a gesture input unit. When the jog dial device is protruded from the surrounding structure, the jog dial device can serve as a mechanical input unit. The voice input unit can convert a user's voice input into an electrical signal. The voice input unit may include at least one microphone. The voice input unit may include a beam forming MIC.

4) Imaging Device

The imaging device 320 can include at least one camera. The imaging device 320 may include at least one of an internal camera and an external camera. The internal camera can capture an image of the inside of the cabin. The external camera can capture an image of the outside of the vehicle. The internal camera can acquire an image of the inside of the cabin. The imaging device 320 may include at least one internal camera. It is desirable that the imaging device 320 include as many cameras as the number of passengers who can ride in the vehicle. The imaging device 320 can provide an image acquired by the internal camera. The main controller 370 or at least one processor included in the cabin system 300 can detect a motion of a user on the basis of an image acquired by the internal camera, generate a signal on the basis of the detected motion and provide the signal to at least one of the display system 350, the cargo system 355, the seat system 360 and the payment system 365. The external camera can acquire an image of the outside of the vehicle. The imaging device 320 may include at least one external camera. It is desirable that the imaging device 320 include as many cameras as the number of doors through which passengers ride in the vehicle. The imaging device 320 can provide an image acquired by the external camera. The main controller 370 or at least one processor included in the cabin system 300 can acquire user information on the basis of the image acquired by the external camera. The main controller 370 or at least one processor included in the cabin system 300 can authenticate a user or acquire body information (e.g., height information, weight information, etc.), fellow passenger information and baggage information of a user on the basis of the user information.

5) Communication Device

The communication device 330 can exchange signals with external devices in a wireless manner. The communication device 330 can exchange signals with external devices through a network or directly exchange signals with external devices. External devices may include at least one of a server, a mobile terminal and another vehicle. The communication device 330 may exchange signals with at least one user terminal. The communication device 330 may include an antenna and at least one of an RF circuit and an RF element which can implement at least one communication protocol in order to perform communication. According to an embodiment, the communication device 330 may use a plurality of communication protocols. The communication device 330 may switch communication protocols according to a distance to a mobile terminal.

For example, the communication device can exchange signals with external devices on the basis of C-V2X (Cellular V2X). For example, C-V2X may include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

6) Display System

The display system 350 can display graphic objects. The display system 350 may include at least one display device. For example, the display system 350 may include a first display device 410 for common use and a second display device 420 for individual use.

6.1) Common Display Device

The first display device 410 may include at least one display 411 which outputs visual content. The display 411 included in the first display device 410 may be realized by at least one of a flat panel display, a curved display, a rollable display and a flexible display. For example, the first display device 410 may include a first display 411 which is positioned behind a seat and formed to be inserted/ejected into/from the cabin, and a first mechanism for moving the first display 411. The first display 411 may be disposed such that it can be inserted/ejected into/from a slot formed in a seat main frame. According to an embodiment, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images can be displayed on both sides thereof. For example, the first display device 410 may be disposed on the ceiling inside the cabin and include a third display formed to be flexible and a third mechanism for bending or unbending the third display. According to an embodiment, the display system 350 may further include at least one processor which provides a control signal to at least one of the first display device 410 and the second display device 420. The processor included in the display system 350 can generate a control signal on the basis of a signal received from at last one of the main controller 370, the input device 310, the imaging device 320 and the communication device 330.

A display area of a display included in the first display device 410 may be divided into a first area 411a and a second area 411b. The first area 411a can be defined as a content display area. For example, the first area 411a may display at least one of graphic objects corresponding to can display entertainment content (e.g., movies, sports, shopping, food, etc.), video conferences, food menu and augmented reality screens. The first area 411a may display graphic objects corresponding to traveling situation information of the vehicle 10. The traveling situation information may include at least one of object information outside the vehicle, navigation information and vehicle state information. The object information outside the vehicle may include information on presence or absence of an object, positional information of an object, information on a distance between the vehicle and an object, and information on a relative speed of the vehicle with respect to an object. The navigation information may include at least one of map information, information on a set destination, route information according to setting of the destination, information on various objects on a route, lane information and information on the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal position information, vehicle engine temperature information, etc. The second area 411b can be defined as a user interface area. For example, the second area 411b may display an AI agent screen. The second area 411b may be located in an area defined by a seat frame according to an embodiment. In this case, a user can view content displayed in the second area 411b between seats. The first display device 410 may provide hologram content according to an embodiment. For example, the first display device 410 may provide hologram content for each of a plurality of users such that only a user who requests the content can view the content.

6.2) Display Device for Individual Use

The second display device 420 can include at least one display 421. The second display device 420 can provide the display 421 at a position at which only an individual passenger can view display content. For example, the display 421 may be disposed on an armrest of a seat. The second display device 420 can display graphic objects corresponding to personal information of a user. The second display device 420 may include as many displays 421 as the number of passengers who can ride in the vehicle. The second display device 420 can realize a touch screen by forming a layered structure along with a touch sensor or being integrated with the touch sensor. The second display device 420 can display graphic objects for receiving a user input for seat adjustment or indoor temperature adjustment.

7) Cargo System

The cargo system 355 can provide items to a user at the request of the user. The cargo system 355 can operate on the basis of an electrical signal generated by the input device 310 or the communication device 330. The cargo system 355 can include a cargo box. The cargo box can be hidden in a part under a seat. When an electrical signal based on user input is received, the cargo box can be exposed to the cabin. The user can select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 can provide a user customized seat to a user. The seat system 360 can operate on the basis of an electrical signal generated by the input device 310 or the communication device 330. The seat system 360 can adjust at least one element of a seat on the basis of acquired user body data. The seat system 360 may include a user detection sensor (e.g., a pressure sensor) for determining whether a user sits on a seat. The seat system 360 may include a plurality of seats on which a plurality of users can sit. One of the plurality of seats can be disposed to face at least another seat. At least two users can set facing each other inside the cabin.

9) Payment System

The payment system 365 can provide a payment service to a user. The payment system 365 can operate on the basis of an electrical signal generated by the input device 310 or the communication device 330. The payment system 365 can calculate a price for at least one service used by the user and request the user to pay the calculated price.

(2) Autonomous Vehicle Usage Scenarios

Figure 7:
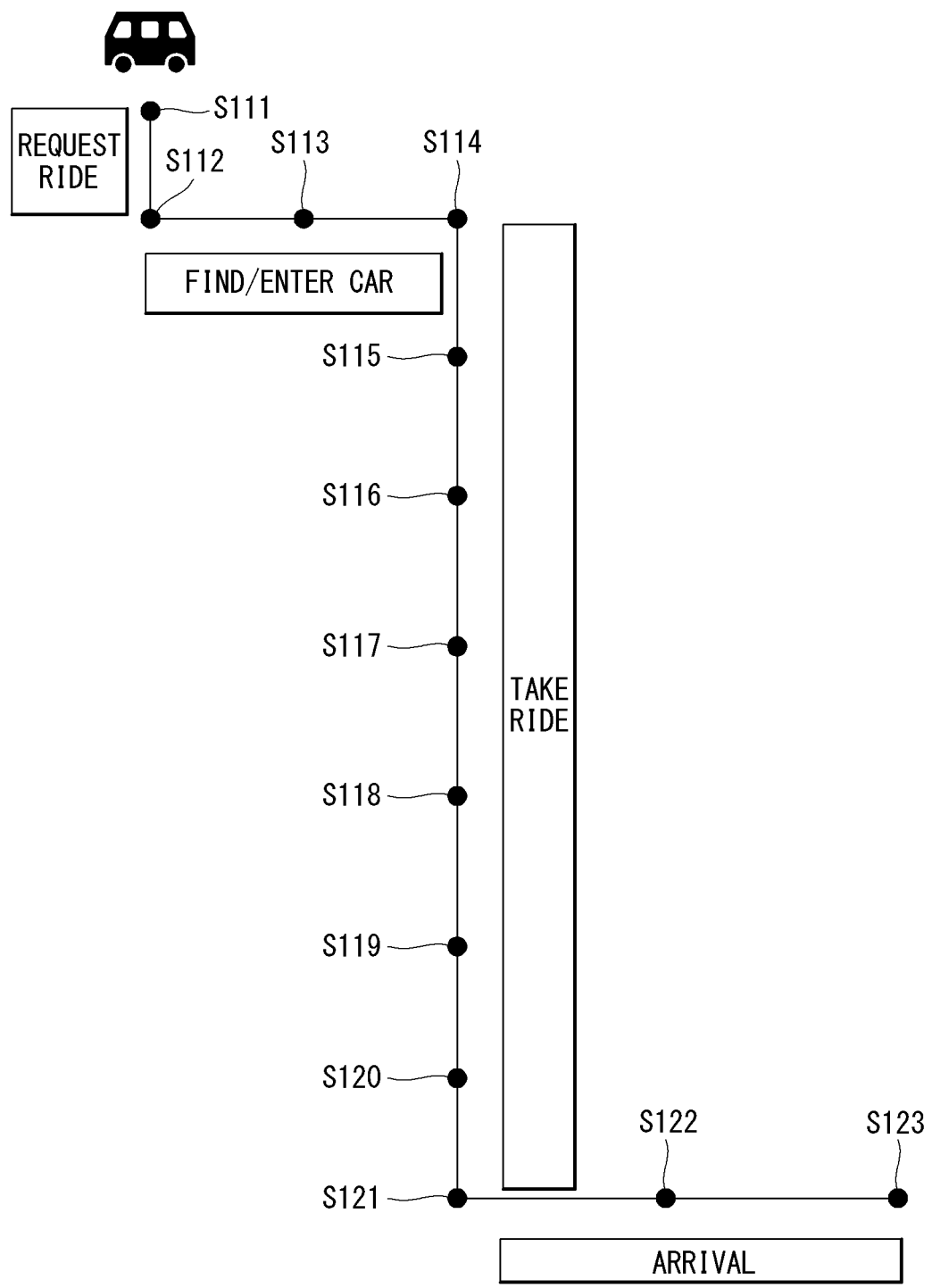
FIG. 7 is a diagram for describing a use scenario of a user according to an embodiment of the present disclosure.

FIG. 7 is a diagram referred to in description of a usage scenario of a user according to an embodiment of the present disclosure.

1) Destination Prediction Scenario

A first scenario S111 is a scenario for prediction of a destination of a user. An application which can operate in connection with the cabin system 300 can be installed in a user terminal. The user terminal can predict a destination of a user on the basis of user's contextual information through the application. The user terminal can provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device can scan a user to acquire body data and baggage data of the user. The body data and baggage data of the user can be used to set a layout. The body data of the user can be used for user authentication. The scanning device may include at least one image sensor. The image sensor can acquire a user image using light of the visible band or infrared band.

The seat system 360 can set a cabin interior layout on the basis of at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light can be disposed on the floor of the cabin. When a user riding in the vehicle is detected, the cabin system 300 can turn on the guide light such that the user sits on a predetermined seat among a plurality of seats. For example, the main controller 370 may realize a moving light by sequentially turning on a plurality of light sources over time from an open door to a predetermined user seat.

4) Seat Adjustment Service Scenario

A fourth scenario S114 is a seat adjustment service scenario. The seat system 360 can adjust at least one element of a seat that matches a user on the basis of acquired body information.

5) Personal Content Provision Scenario

A fifth scenario S115 is a personal content provision scenario. The display system 350 can receive user personal data through the input device 310 or the communication device 330. The display system 350 can provide content corresponding to the user personal data.

6) Item Provision Scenario

A sixth scenario S116 is an item provision scenario. The cargo system 355 can receive user data through the input device 310 or the communication device 330. The user data may include user preference data, user destination data, etc. The cargo system 355 can provide items on the basis of the user data.

7) Payment Scenario

A seventh scenario S117 is a payment scenario. The payment system 365 can receive data for price calculation from at least one of the input device 310, the communication device 330 and the cargo system 355. The payment system 365 can calculate a price for use of the vehicle by the user on the basis of the received data. The payment system 365 can request payment of the calculated price from the user (e.g., a mobile terminal of the user).

8) Display System Control Scenario of User

An eighth scenario S118 is a display system control scenario of a user. The input device 310 can receive a user input having at least one form and convert the user input into an electrical signal. The display system 350 can control displayed content on the basis of the electrical signal.

9) AI Agent Scenario

A ninth scenario S119 is a multi-channel artificial intelligence (AI) agent scenario for a plurality of users. The AI agent 372 can discriminate user inputs from a plurality of users. The AI agent 372 can control at least one of the display system 350, the cargo system 355, the seat system 360 and the payment system 365 on the basis of electrical signals obtained by converting user inputs from a plurality of users.

10) Multimedia Content Provision Scenario for Multiple Users

A tenth scenario S120 is a multimedia content provision scenario for a plurality of users. The display system 350 can provide content that can be viewed by all users together. In this case, the display system 350 can individually provide the same sound to a plurality of users through speakers provided for respective seats. The display system 350 can provide content that can be individually viewed by a plurality of users. In this case, the display system 350 can provide individual sound through a speaker provided for each seat.

11) User Safety Secure Scenario

An eleventh scenario S121 is a user safety secure scenario. When information on an object around the vehicle which threatens a user is acquired, the main controller 370 can control an alarm with respect to the object around the vehicle to be output through the display system 350.

12) Personal Belongings Loss Prevention Scenario

A twelfth scenario S122 is a user's belongings loss prevention scenario. The main controller 370 can acquire data about user's belongings through the input device 310. The main controller 370 can acquire user motion data through the input device 310. The main controller 370 can determine whether the user exits the vehicle leaving the belongings in the vehicle on the basis of the data about the belongings and the motion data. The main controller 370 can control an alarm with respect to the belongings to be output through the display system 350.

13) Alighting Report Scenario

A thirteenth scenario S123 is an alighting report scenario. The main controller 370 can receive alighting data of a user through the input device 310. After the user exits the vehicle, the main controller 370 can provide report data according to alighting to a mobile terminal of the user through the communication device 330. The report data can include data about a total charge for using the vehicle 10.

Clothing Management Device for Vehicle

Based on the contents described above, a clothing management device for vehicle according to a first embodiment of the present disclosure is described in detail below.

The clothing management device for vehicle according to the first embodiment of the present disclosure may be mounted on an autonomous vehicle and may manage clothing of a user boarding the autonomous vehicle for an estimated time until the user arrives at a destination.

The clothing management device for vehicle according to the first embodiment of the present disclosure may be mounted on an electric vehicle using electric energy, and may need to minimize electric energy consumed for the clothing management when electric energy of the electric vehicle is used.

Figure 8:
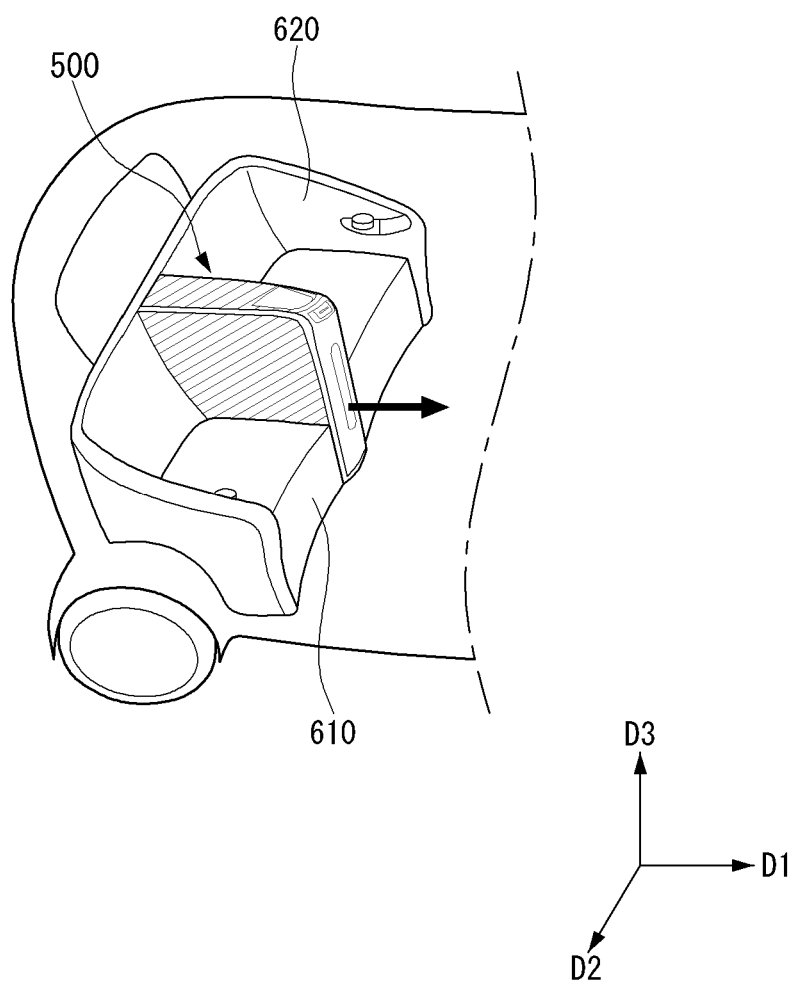
FIG. 8 illustrates that a clothing management device for vehicle according to the present disclosure is installed inside a vehicle.

FIG. 8 illustrates that a clothing management device for vehicle according to the present disclosure is installed inside a vehicle.

According to FIG. 8, a clothing management device 500 for vehicle may be positioned between a first seat 610 and a second seat 620 of the vehicle. In this instance, the first seat 610 and the second seat 620 may mean seats arranged side by side inside the vehicle.

The clothing management device 500 may be positioned in other spaces inside the vehicle as well as a space between the seats. Specifically, the clothing management device 500 may be positioned in a vehicle door, a space between the front and rear seats, etc.

The clothing management device 500 may be provided for not only vehicles such as small vehicles and medium-sized vehicles but also large vehicles such as buses, trailers, and campers.

According to FIG. 8, when the clothing management device 500 is positioned in the space between the first seat 610 and the second seat 620, the clothing management device 500 may be opened in a D1 direction. That is, since the vehicle generally has an empty space between the front and rear seats, a door of the clothing management device 500 may use the empty space.

Thus, in the clothing management device 500, a width of the D1 direction may be greater than a width of a D2 direction, and the door of the clothing management device 500 may move in the D1 direction.

The clothing management device 500 may have a height of a D3 direction. When the clothing management device 500 is positioned in the space between the first seat 610 and the second seat 620, an upper surface of the clothing management device 500 may be positioned below headrests of the first and second seats 610 and 620. The height of the clothing management device 500 may be less than heights of the first and second seats 610 and 620.

If two users board the vehicle, the two users may generally board the first seat 610 and the second seat 620. In this case, it is preferable that the clothing management device 500 does not obstruct the users' view for communication between the users.

The clothing management device 500 for vehicle according to the present disclosure is described below on the assumption that the clothing management device 500 is provided in the vehicle as illustrated in FIG. 8.

Figure 9:
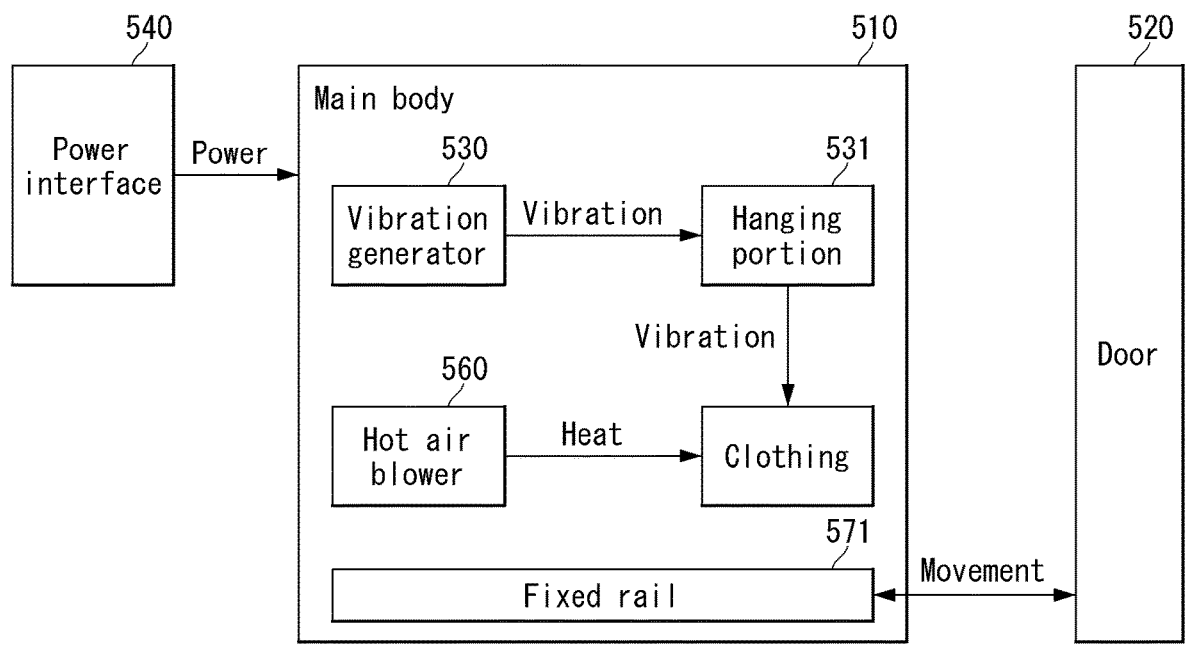
FIG. 9 is a block diagram illustrating a clothing management device for vehicle according to a first embodiment of the present disclosure.

FIG. 9 is a block diagram illustrating a clothing management device for vehicle according to the first embodiment of the present disclosure.

According to FIG. 9, a clothing management device 500 for vehicle according to the first embodiment of the present disclosure may include a main body 510, a door 520, and a power interface 540. The power interface 540 may transfer power of the vehicle to respective components of the main body 510.

According to FIG. 9, the main body 510 may include a vibration generator 530, a hanging portion 531, a hot air blower 560, and a fixed rail 571 therein. The vibration generator 530 may transfer vibration to the hanging portion 531, and the hanging portion 531 may transfer the vibration to clothing. That is, the vibration generator 530 may generate vibration to be transferred to clothing.

The hot air blower 560 may transfer heat to clothing. The clothing may be dried due to the heat of the hot air blower 560. The hot air blower 560 may transfer heat by applying hot air to clothing.

The door 520 may be connected to the fixed rail 571 and may slidingly move. The fixed rail 571 may be installed on one surface of the main body 510. The door 520 may move along the fixed rail 571.

Figure 10:
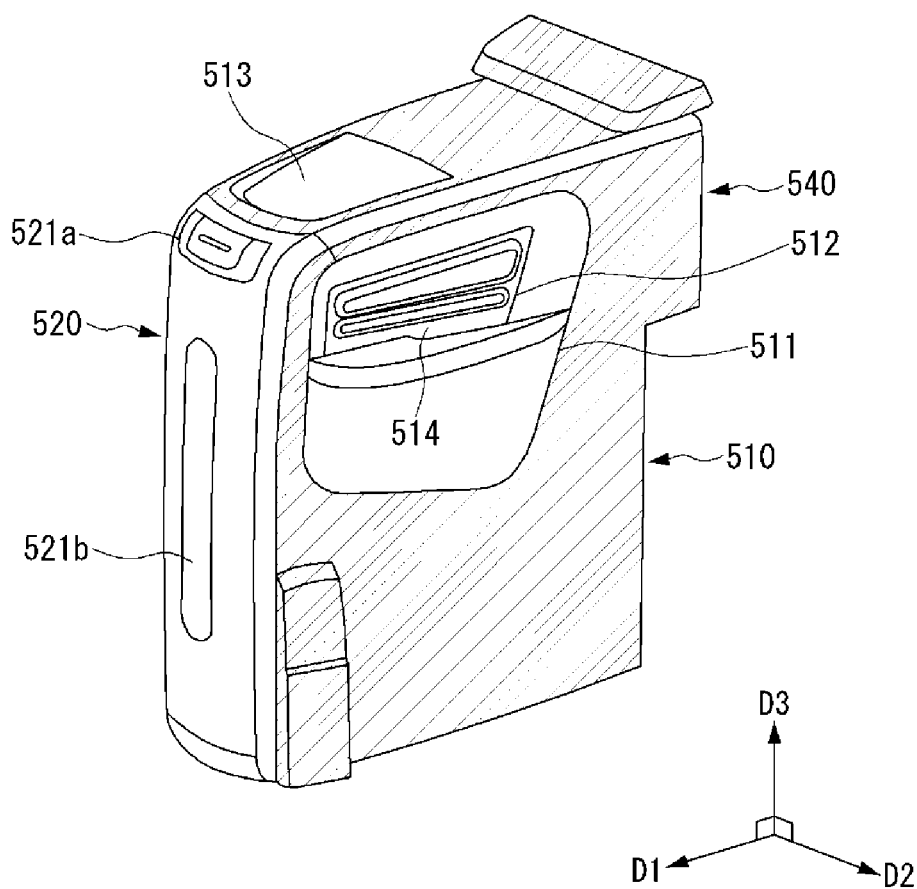
FIGS. 10 and 11 are perspective views illustrating a clothing management device for vehicle according to a first embodiment of the present disclosure.
Figure 11:
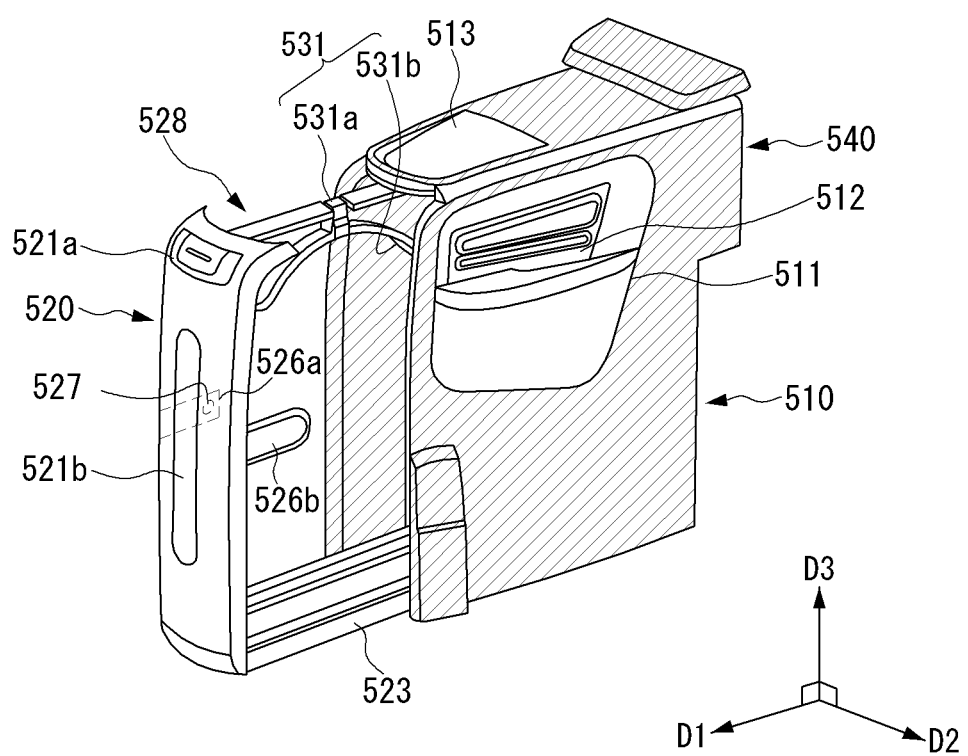

FIGS. 10 and 11 are perspective views illustrating a clothing management device for vehicle according to the first embodiment of the present disclosure.

According to FIG. 10, the clothing management device 500 for vehicle according to the first embodiment of the present disclosure may include the main body 510, the door 520, and the power interface 540.

The main body 510 may be provided in the vehicle and may store clothing, and the door 520 may open and close an opened portion of the main body 510. The power interface 540 may transfer power of the vehicle to the vibration generator 530. The power interface 540 may also transfer power of the vehicle to other components requiring power of the vehicle.

The main body 510 may be configured such that one surface is open. The one open surface of the main body 510 may be opened and closed by the door 520. The main body 510 may be provided in the vehicle and may store clothing.

According to FIG. 10, the main body 510 may include an armrest 511, a storage part 512, and an external lighting 514 at one side of the main body 510. The main body 510 may further include an article holder 513 on an upper surface of the main body 510.

The armrest 511 is configured such that the user can rest his or her arm thereon when the clothing management device 500 is positioned in the space between the first seat 610 and the second seat 620 as illustrated in FIG. 8.

The storage part 512 may be an empty space between one side of the main body 510 and the armrest 511. The storage part 512 may indicate a space provided to store user's small items.

The external lighting 514 is positioned on one side of the main body 510 and can illuminate an interior space of the vehicle. In addition, the external lighting 514 can give an aesthetic feeling to the user and allow the user to identify the clothing management device 500 in the dark vehicle interior.

The article holder 513 may indicate a groove dug in the upper surface of the main body 510. A coil (not shown) for wireless charging may be further provided inside an upper plate 517 of the main body 510 on which the article holder 513 is positioned. When a device supporting wireless charging is placed on the article holder 513, power can be wirelessly supplied through the coil.

The main body 510 may have a D1 direction width, a D2 direction width, and a D3 direction height. The D1 direction width may be greater than the D2 direction width. The power interface 540 transferring power, etc. may be positioned on a rear surface of the main body 510.

The main body 510 may have a space therein. The clothing may be stored in the inner space of the main body 510, and devices for the movement of the door 520 may be provided in the inner space of the main body 510.

The door 520 may further include an indicator 521a and a window 521b.

The indicator 521a is configured to indicate a clothing management condition to the outside. The indicator 521a may include a display. The user can know the clothing management condition based on a kind, an intensity, a color, or a pattern of light, etc. displayed on the indicator 521a. The user may enter a command into the clothing management device through touch sensors, switches, etc. included in the indicator 521a.

The window 521b may include a transparent material so that the user can directly see the inside of the clothing management device 500. The window 521b may include a transparent display. The window 521b may display advertisements, UI, icons, images, etc. Since the window 521b includes the transparent display, the user can observe the inside of the clothing management device 500.

According to FIG. 11, the clothing management device 500 in which the door 520 is opened may have a storage space capable of storing clothing. The clothing management device 500 may further include the hanging portion 531 capable of hanging clothes. The hanging portion 531 may be configured to store clothing in the main body 510. The hanging portion 531 may take the form of a hanger.

The hanging portion 531 may include a fastening portion 531a that can be fastened to or detached from a door arm 528, and a support portion 531b for supporting to hang clothing. The support portion 531b may be connected to the fastening portion 531a and may support clothing inside the main body. As illustrated in FIG. 11, the support portion 531b may have a curved shape so that both ends of the support portion 531b face down. The support portion 531b may have a rod shape that is not curved and extends in a straight line, but embodiments are not limited thereto.

The clothing management device 500 for vehicle according to the present disclosure may generate vibration and transfer the vibration to the hanging portion 531. Thus, the clothing management device 500 for vehicle can transfer the vibration to clothing on the hanging portion 531 and thus can brush foreign substances, such as dust, off the surface of clothing by the transferred vibration.

According to FIGS. 10 and 11, the clothing management device 500 for vehicle according to the present disclosure may include a first state in which the door 520 is opened, and a second state in which the door 520 is closed. The state may be changed by the user's command input. That is, if the user enters a close command in the first state, the first state may be changed to the second state, and if the user enters an open command in the second state, the second state may be changed to the first state.

In addition, if the user stands in front of the clothing management device 500, the second state may be changed to the first state. If the user hangs clothing on the hanging portion 531 and fastens the hanging portion 531 to the door arm 528, the first state may be changed to the second state. If an operation of the clothing management device 500 finishes, the second state may be changed to the first state. If an emergency occurs during the operation of the clothing management device 500 or the autonomous vehicle arrives at a destination, the second state may be changed to the first state.

Figure 12:
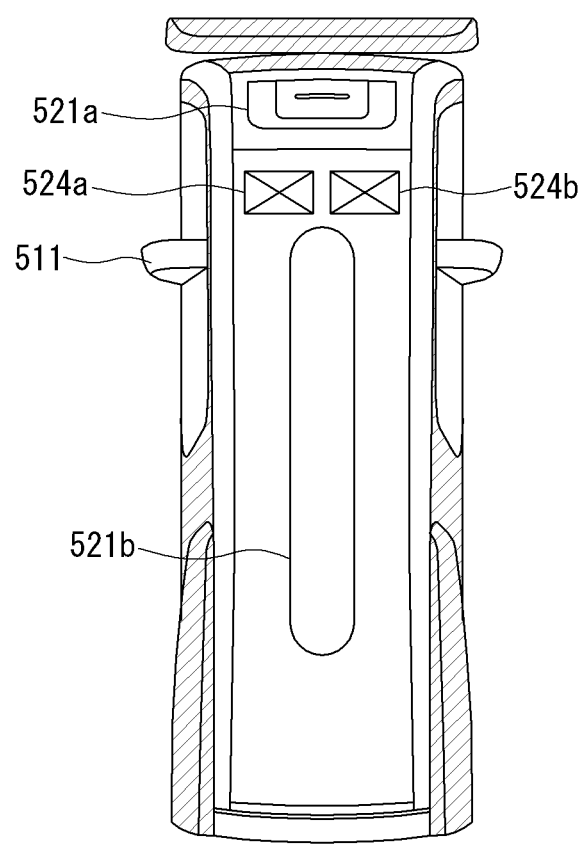
FIG. 12 is a front view illustrating a clothing management device for vehicle according to a first embodiment of the present disclosure.

FIG. 12 is a front view illustrating a clothing management device for vehicle according to the first embodiment of the present disclosure.

According to FIG. 12, the clothing management device 500 for vehicle may further include a vision recognition camera 524a and/or a voice recognition microphone 524b, in addition to the indicator 521a, the armrest 511, and the window 521b. The vision recognition camera 524a may recognize an appearance, etc. of the user positioned around the clothing management device 500, and the voice recognition microphone 524b may recognize a voice, etc. of the user positioned around the clothing management device 500.

The armrest 511 may be disposed on both sides of the clothing management device 500, and the window 521b may be disposed on one outer surface of the clothing management device 500. In FIG. 12, the vision recognition camera 524a and the voice recognition microphone 524b are illustrated in front, but such a positional feature is merely an example and does not limit the right scope of the present disclosure.

Figure 13:
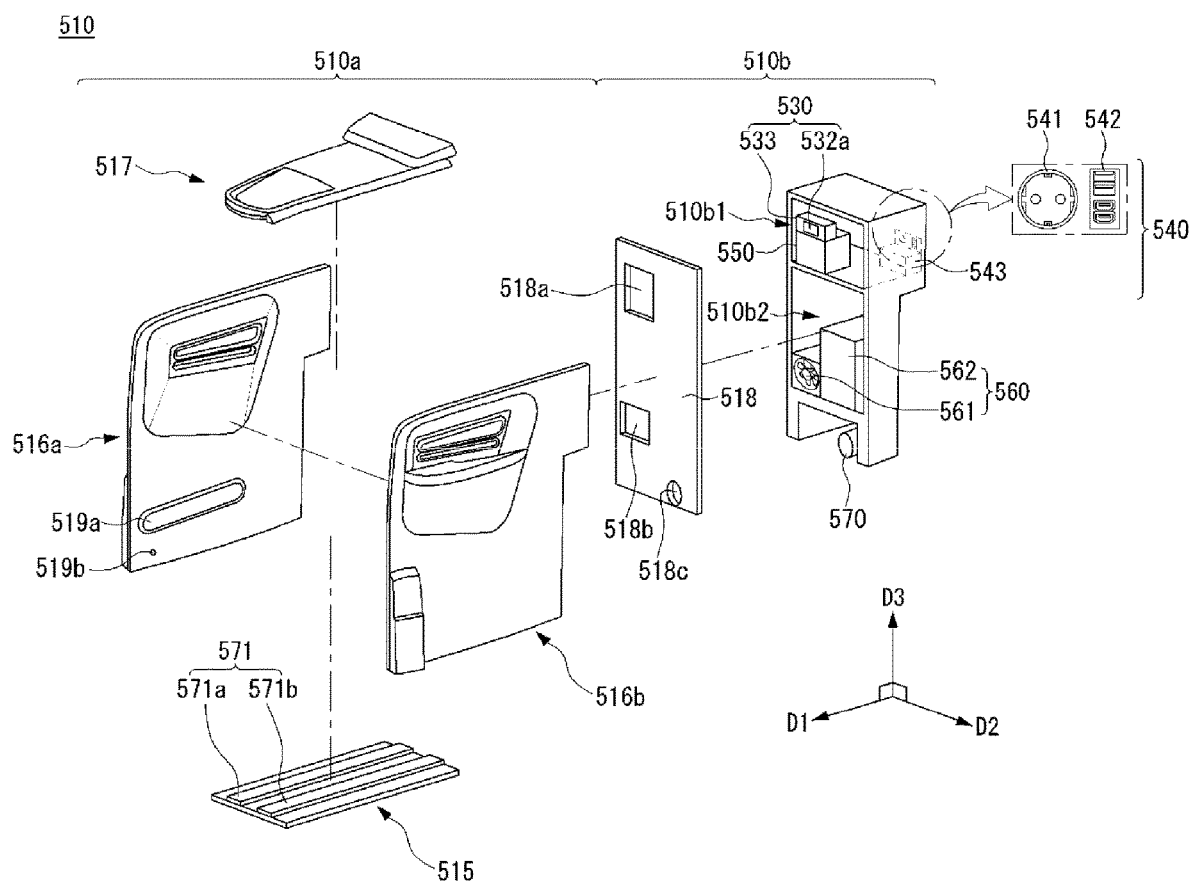
FIG. 13 is an exploded view of a main body of a clothing management device for vehicle according to a first embodiment of the present disclosure.

FIG. 13 is an exploded view of a main body of a clothing management device for vehicle according to the first embodiment of the present disclosure.

According to FIG. 13, the main body 510 may include a first main body part 510a and a second main body part 510b. The first main body part 510a may include a lower plate 515, a side plate 516, an upper plate 517, and a rear plate 518. The second main body part 510b may be positioned behind the rear plate 518 of the first main body part 510a and may include a plurality of spaces.

According to FIG. 13, at least one fixed rail 571 may be installed on the lower plate 515. The door 520 may be connected to at least one fixed rail 571 installed on the lower plate 515 of the main body 510. FIG. 13 illustrates two fixed rails 571, by way of example, but is merely an example. When two fixed rails 571 are installed, the two fixed rails 571 may include a first rail 571a and a second rail 571b.

The side plate 516 may include a left side plate 516a and a right side plate 516b. The left side plate 516a and the right side plate 516b may have a symmetrical structure. The inside of each of the left side plate 516a and the right side plate 516b may include an interior lighting 519a. When the clothing management device 500 operates, the interior lighting 519a may be turned on to illuminate the interior. By the interior lighting 519a, the user can check the inside of the clothing management device 500 through the window 521b.

The inside of each of the left side plate 516a and the right side plate 516b may further include a sensor 519b. The sensor 519b may include an ultrasonic sensor, a humidity sensor, a temperature sensor, an infrared sensor, or the like. In this instance, the ultrasonic sensor or the infrared sensor may be configured to detect when clothing hangs on the hanging portion 531 and falls by vibration.

The rear plate 518 may include openings corresponding to the components included in the second main body part 510b. For example, the rear plate 518 may include a first opening 518a for a vibration motor 533, a second opening 518b for the hot air blower 560, and a third opening 518c for a suction 570.

The second main body part 510b may include a first space 510b1 and a second 510b2. In the first space 510b1, the vibration motor 533 and a controller 550 may be positioned.

In the second 510*b*2, the hot air blower 560 may be positioned. The hot air blower 560 may include at least one fan 561 and an air heating part 562.

The first space 510*b*1 and the second 510*b*2 are configured to utilize the space and are merely an example. Thus, the positions of the vibration motor 533, the controller 550, and the hot air blower 560 do not limit the right scope of the present disclosure.

The second main body part 510*b* may include the power interface 540. The power interface 540 may transfer power of the vehicle to the vibration generator 530.

The clothing management device 500 for vehicle according to the present disclosure may be configured to be detachable from the vehicle. Thus, the user can remove the clothing management device 500 from the vehicle and install other configurations according to his/her taste. In order to attach and detach electric appliances that consume power as above, it is preferable to receive power from the vehicle via the power interface 540.

Figure 16:
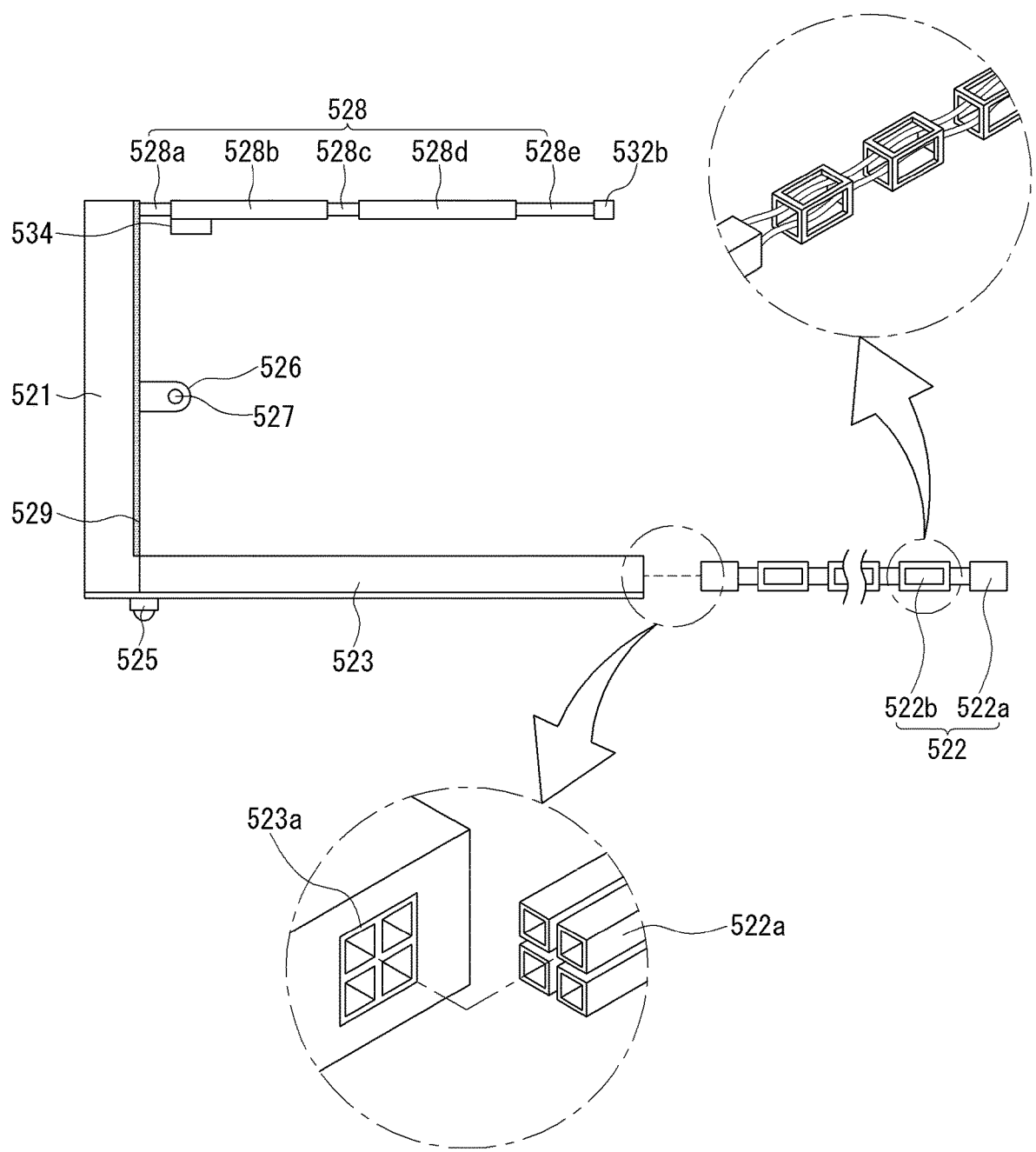
FIG. 16 illustrates a door according to a first embodiment of the present disclosure.

The clothing management device 500 for vehicle according to the first embodiment of the present disclosure may include the vibration generator 530. The vibration generator 530 may include the vibration motor 533 generating vibration and a coupling member 532*a*. The coupling member 532*a* may be coupled to a transfer member 532*b* illustrated in FIG. 16. The transfer member 532*b* of FIG. 16 may be configured to transfer vibration generated by the vibration motor 533 to the door arm 528. Referring to FIGS. 13 and 16, the vibration generator 530 may further include the transfer member 532*b* in addition to the vibration motor 533 and the coupling member 532*a*. That is, the vibration generator 530 may be provided in the main body 510 and configured to generate vibration in clothing stored in the main body 510.

The power interface 540 may include a power converter 543, a first connector 541, and a second connector 542. The first connector 541 may be a part that receives power of the vehicle. For example, an electric plug installed in the vehicle may be inserted into the first connector 541. The second connector 542 may be configured to receive power or other input. For example, the second connector 542 may receive control signals from the vehicle. The configuration for receiving these signals may include an USB terminal, etc., but embodiments are not limited thereto.

The power converter 543 may be configured to convert power supplied from the vehicle into a voltage required for the clothing management device 500. Alternatively, the power converter 543 may be configured to convert DC power of the vehicle into AC power or convert AC power into DC power.

The hot air blower 560 may be configured to supply hot air to the inside of the clothing management device 500. That is, the hot air blower 560 may be provided in the main body 510 and configured to dry clothing. The air heating part 562 of the hot air blower 560 may be connected to the outside. The air heating part 562 inhales outside air and heats it. In this instance, the outside may mean the outside of the clothing management device 500 inside the vehicle, and also mean the outside of the vehicle. The fan 561 of the hot air blower 560 may transfer air heated by the air heating part 562 to the inside of the clothing management device 500.

It is preferable that the hot air blower 560 is positioned on the rear surface of the main body 510, but embodiments are not limited thereto. It is preferable that the hot air blower 560 is positioned on a lower part of the main body 510, but embodiments are not limited thereto. However, since hot air goes up, the hot air blower 560 may be positioned on the rear surface and the lower part of the main body 510. This is to form air circulation inside the clothing management device 500.

The second main body part 510*b* may include the suction 570. The suction 570 may be configured to suck dust, etc. from clothing. When the dust adhered to clothing falls by the vibration of the vehicle and the vibration generated by the vibration generator 530, the suction 570 may suck the dust and discharge it to the outside.

Figure 14:
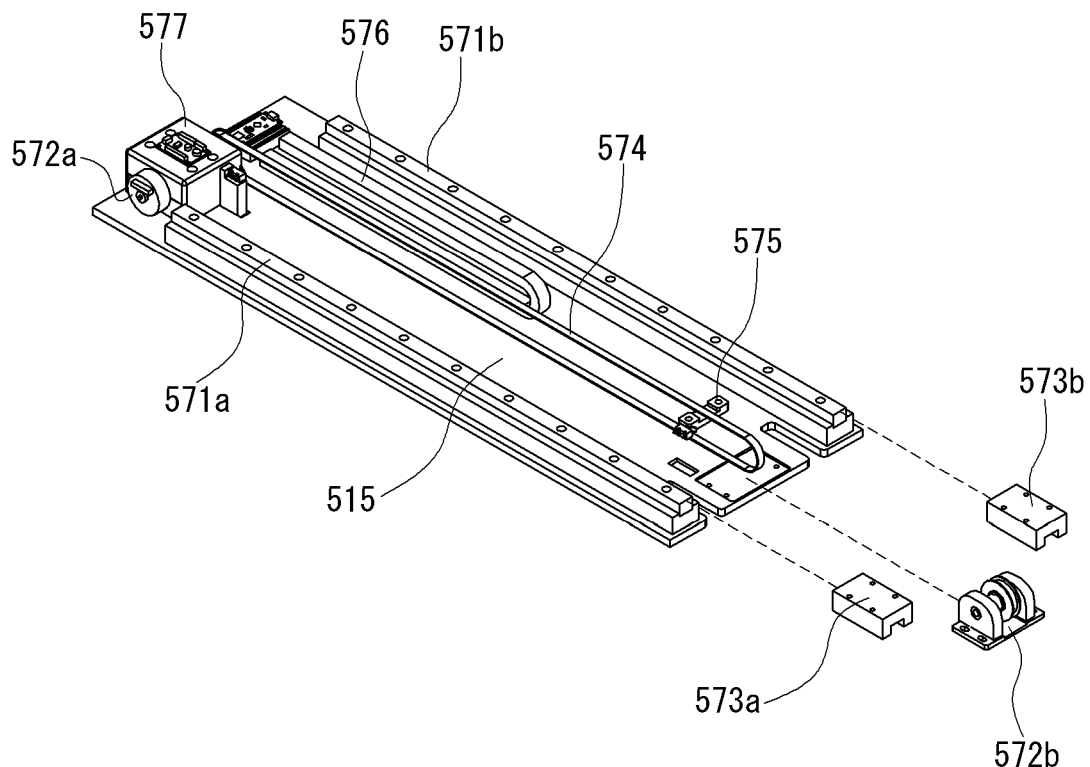
FIG. 14 illustrates a lower plate of a main body according to a first embodiment of the present disclosure and some of components for a sliding movement of a door.

FIG. 14 illustrates a lower plate of a main body according to the first embodiment of the present disclosure and some of components for a sliding movement of a door.

According to FIG. 14, the main body 510 according to the first embodiment of the present disclosure may include the fixed rail 571 that is formed on one surface inside the main body 510 and extends from an entrance of the main body 510 to the inside of the main body 510.

According to FIG. 14, the lower plate 515 of the main body 510 according to the first embodiment of the present disclosure may include the fixed rail 571. The fixed rail 571 may include a first rail 571*a* and a second rail 571*b*.

According to FIG. 14, the fixed rail 571 may be connected to a first slider 573*a* for slidingly moving on the first rail 571*a* and a second slider 573*b* slidingly moving on the second rail 571*b*. However, one end of the fixed rail 571 may further include a bump (not shown) so that the first slider 573*a* and the second slider 573*b* do not deviate from the fixed rail 571.

The first slider 573*a* and the second slider 573*b* may be connected to a lower plate 523 of the door 520. Thus, the door 520 may slidingly move along a sliding movement direction of the first slider 573*a* and the second slider 573*b*. That is, the door 520 may slidingly move along the fixed rail 571.

According to FIG. 14, a first roller 572*a* and a second roller 572*b* may be installed on the lower plate 515 of the main body 510. That is, the first roller 572*a* may be connected to a rotary motor 577. That is, the first roller 572*a* may rotate by receiving rotational power from the rotary motor 577.

A belt 574 connecting the first roller 572*a* and the second roller 572*b* may be installed. If the first roller 572*a* rotates by receiving rotational power from the rotary motor 577, the belt 574 may move in response to the rotation of the first roller 572*a*. If the belt 574 moves, the second roller 572*b* may also rotate together to help the movement of the belt 574. The belt 574 may include a connection unit 575, and the connection unit 575 may be connected to the lower plate 523 of the door 520. Thus, if the belt 574 moves, the door 520 may move in response to the movement of the belt 574.

The lower plate 515 of the main body 510 may further include a supporting part 576. When the lower plate 523 of the door 520 slidingly moves in response to the movement of the connection unit 575, the supporting part 576 may be configured to support the lower plate 523 of the door 520.

Figure 15:
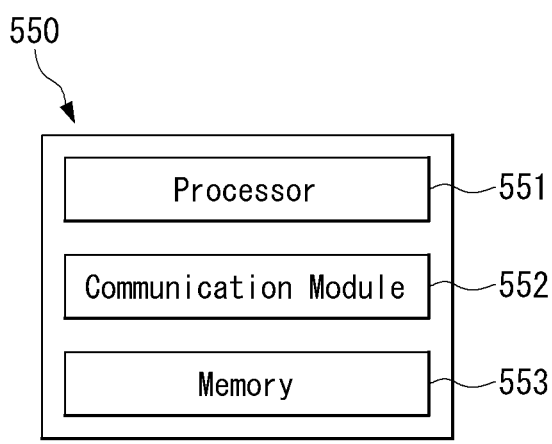
FIG. 15 illustrates a controller according to a first embodiment of the present disclosure.

FIG. 15 illustrates a controller according to the first embodiment of the present disclosure.

According to FIG. 15, the controller 550 may include a processor 551, a communication module 552, and a memory 553.

The processor 551 may be configured to perform operations and control other devices. The processor 551 may mainly mean a central computing unit (CPU), an application processor (AP), a graphics processing unit (GPU), etc. The CPU, the AP or the GPU may include one or more cores therein and may operate using an operating voltage and clock signals. However, the CPU or the AP may be comprised of several cores optimized for serial processing, while the GPU may be comprised of thousands of smaller and more efficient cores designed for parallel processing.

The communication module 552 performs transmission and reception of information with a base station or a vehicle having a communication function via an antenna. The communication module 552 using wireless communication may include a modulator, a demodulator, a signal processing unit, etc.

The wireless communication refers to communication using wireless communication networks using communication facilities and frequencies that have been previously installed by communication companies. The wireless communication may be used for various wireless communication systems, such as code division multiple access (CDMA), frequency division multiple access (FDMA), time division multiple access (TDMA), orthogonal frequency division multiple access (OFDMA), and single carrier frequency division multiple access (SC-FDMA), and 3rd generation partnership project (3GPP) long term evolution (LTE) may be used. In addition, 5G communication which is recently commercialized may be mainly used, and 6G which is scheduled for commercialization in the future may also be used. However, the present disclosure can utilize an already installed communication network without being restricted to these wireless communication methods.

The memory 553 may include a volatile memory and/or a nonvolatile memory. The memory 553 may include hard disk drive (HDD), solid state disk (SSD), silicon disk drive (SDD), ROM, RAM, etc., but embodiments are not limited thereto.

The memory 553 may store sensing information received from a sensing unit 527 or a sensor 519*b*. The processor 551 may send a command corresponding to the sensing information received from the sensing unit 527 or the sensor 519*b* to the respective components of the clothing management device 500.

For example, if the sensing unit 527 takes a video or image of fibers constituting clothing, data indicating the video or the image may be transmitted to an external server through the communication module. The external server analyzes a fiber type of the clothing based on the corresponding data. The communication module receives a result of analysis from the external server and transmits it to the processor 551. The processor 551 may send a command for adjusting a temperature of the hot air blower 560 to the hot air blower 560 based on the transmitted analysis result.

For example, if the sensor 519*b* installed inside the side plate 516 detects that clothing has fallen off the hanging portion 531, the processor 551 may immediately stop the operation of the clothing management device 500 and send the indicator 521*a* a command that the indicator 521*a* displays that the clothing has fallen off. Details of command content and a command time may be stored in the memory 553.

For example, if humidity or temperature inside the clothing management device 500 is detected by the sensor 519*b* installed inside the side plate 516, the processor 551 may immediately stop the operation of the clothing management device 500 and send the indicator 521*a* a command that the indicator 521*a* displays that the humidity or the temperature is high. Details of command content and a command time may be stored in the memory 553.

FIG. 16 illustrates a door according to the first embodiment of the present disclosure.

According to FIG. 16, the door 520 may include a front plate 521, the lower plate 523, and the door arm 528. That is, the door 520 according to the present disclosure may be fastened to the hanging portion 531, and may include the door arm 528 that transfers vibration generated by the vibration generator 530 to the hanging portion 531.

The indicator 521*a* and/or the window 521*b* may be installed on a front surface of the front plate 521. The lower plate 523 of the door 520 may be connected to the first slider 573*a*, the second slider 573*b*, and the connection unit 575 of the belt 574 and may slidingly move. In order to help the sliding movement of the door 520, a moving unit 525 may be installed on a lower surface of the lower plate 523 of the door 520. At least one moving unit 525 may be installed, and the door 520 may smoothly move by the moving unit 525. The moving unit 525 may include a wheel so that the door 520 can move smoothly. The moving unit 525 may further include a rotating shaft installed at the center of the wheel.

According to FIG. 16, the door 520 may include at least one guide portion 526. The guide portion 526 may be positioned on a rear surface of the front plate 521 of the door 520. In addition, the guide portion 526 may be connected to one end of the door 520. According to FIG. 11, the door 520 may include two guide portions 526*a* and 526*b*, and the two guide portions 526*a* and 526*b* may be respectively connected to both side ends of the door 520. Further, according to FIG. 11, the sensing unit 527 may be installed on inner surfaces of the guide portions 526*a* and 526*b*.

The guide portion 526 may be configured to prevent clothing hanging on the hanging portion 531 from coming off. That is, when the user hangs clothing on the hanging portion 531 and then fastens the hanging portion 531 to the door arm 528 of the door 520, a portion of the clothing may get out of the door 520 and the main body 510. The guide portion 526 may be configured to prevent a portion of clothing from getting out of the outside.

The sensing unit 527 may be configured to sense a fiber type of clothing. The sensing unit 527 may be a camera for utilizing vision recognition. If the sensing unit 527 is a camera, the sensing unit 527 may include a lens, an image sensor, an aperture, and the like. Since the lens may be damaged by the movement of the clothing, a protective glass capable of protecting the lens may be installed outside the lens.

The door arm 528 may be connected to an upper end of the front plate 521 of the door 520. The door arm 528 may include a gap portion 528*a*, a first arm portion 528*b*, a fastening groove 528*c*, a second arm portion 528*d*, and a third arm portion 528*e*. The door arm 528 may be configured to receive vibration of the vibration motor 533 through the transfer member 532*b*. If vibration is transferred to the door arm 528, the vibration may be transferred to the hanging portion 531 fastened to the door arm 528. If the vibration is transferred to the hanging portion 531, the vibration may be transferred to the clothing hanging on the hanging portion 531.

In this instance, the direction of vibration may move in a downward and upward direction and move in a forward and backward direction. However, when considering a movement direction and a shape of the door 520, it is preferable that the vibration moves in the forward and backward direction. The forward and backward direction may be a first direction. The first direction may be the D1 direction illustrated in FIGS. 8, 10 and 11.

When the door arm 528 vibrates in the forward and backward direction, the gap portion 528*a* may be configured to secure a predetermined space. The gap portion 528*a* may be configured so that shaking due to vibration is not transferred to the front plate 521 of the door 520. The gap portion 528*a* may include an elastic member such as a spring, or may include a hydraulic cylinder. The vibration may not be transferred to the front plate 521 of the door 520 by the elastic member or the hydraulic cylinder.

Cross-sectional diameters of the first arm portion 528*b* and the second arm portion 528*d* may be greater than cross-sectional diameters of the fastening groove 528*c* and the third arm portion 528*e*. It is preferable that the fastening groove 528*c* has a shape that is dug so that the fastening portion 531*a* of the hanging portion 531 can be fastened to it.

The third arm portion 528*e* may be connected to the transfer member 532*b*. The transfer member 532*b* may be connected to the vibration motor 533 included in the main body 510. The transfer member 532*b* may be coupled to the coupling member 532*a* of the vibration motor 533.

A scent patch 534 may be provided on a lower surface of the first arm portion 528*b*. The scent patch 534 may be selected according to the user's taste. The clothing may be deodorized by the scent patch 534, and the scent may be transferred to the clothing. A position of the scent patch 534 may be inside the main body 510 and may be near the clothing, and is not limited to the lower part of the first arm portion 528*b*.

A cable 522 may be configured to provide control signals and/or power required for the door 520 and to transmit information sensed from the sensing unit 527 to the controller 550.

The cable 522 may include a plurality of wires. Since the cable 522 may be damaged due to the sliding movement of the door 520, the cable 522 may further include a plurality of cubes 522*b*. The cable 522 is protected by the cubes 522*b*. The plurality of cubes 522*b* is provided and has a shape with an empty inside, and the cable 522 passes through the inside of the cube 522*b*. The plurality of cubes 522*b* is positioned apart from each other, and hence the cable 522 may be freely modified.

The cable 522 may be connected to the lower plate 523 of the door 520. Both ends of the cable 522 may include connectors 522*a* for connection. One end of the lower plate 523 of the door 520 may include a connector 523*a* corresponding to the connector 522*a* of the cable 522. According to FIG. 16, the connectors 522*a* at both ends of the cable 522 may be male connectors 522*a*, and the connector 523*a* at one end of the lower plate 523 of the door 520 may be a female connector 523*a* corresponding to the male connector 522*a*.

A sealing 529 may be included in an inner surface of the front plate 521 of the door 520. Specifically, the sealing 529 may be included in a portion, contacting the main body 510, in which the door 520 is closed. The sealing 529 can block the inside and the outside of the main body 510 when the door 520 is closed. This is because dust of the clothing may spread into the vehicle in the process of bruising the dust off the clothing with the vibration when the clothing management device 500 operates inside the vehicle. The dust spreading into the vehicle may adversely affect the health of vehicle occupants. In addition, the sealing 529 can block an internal noise generated by the operation of the clothing management device 500. The sealing 529 may include an elastic material such as rubber.

Figure 17:
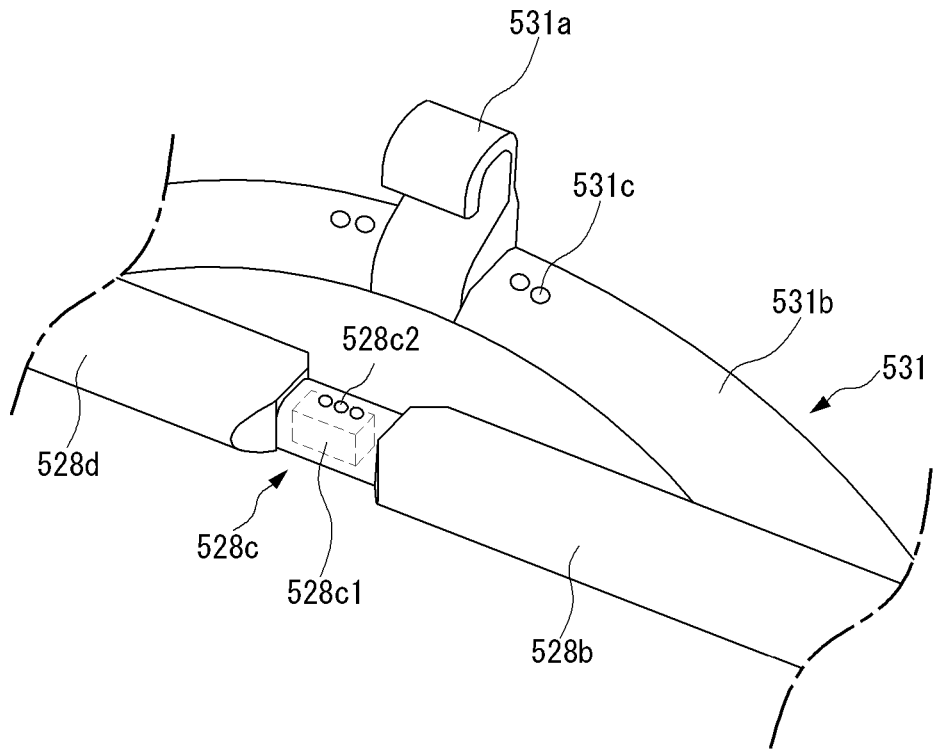
FIG. 17 illustrates a hanging portion and a door arm according to a first embodiment of the present disclosure.

FIG. 17 illustrates the hanging portion and the door arm according to the first embodiment of the present disclosure.

According to FIG. 17, the hanging portion 531 may include the fastening portion 531*a* and the support portion 531*b*. The fastening portion 531*a* may be configured to fasten to the fastening groove 528*c* of the door arm 528. The fastening portion 531*a* may have a ring shape. A ring of the fastening portion 531*a* and a groove of the fastening groove 528*c* may be coupled to each other without a gap. A magnetic material may be included in the fastening portion 531*a*. An electromagnet 528*c*1 may be included inside the fastening groove 528*c*. Thus, when the door arm 528 receives power of the vehicle from the power interface 540 and transfers the power to the electromagnet 528*c*1, magnetism may be generated from the electromagnet 528*c*1. The fastening groove 528*c* may be fastened to the fastening portion 531*a* using the magnetism of the electromagnet 528*c*1. That is, the fastening of the fastening portion 531*a* and the fastening groove 528*c* can be controlled through the supply of power.

The fastening groove 528*c* may include a plurality of connection terminals 528*c*2. The connection terminals 528*c*2 are terminals used to supply control signals and/or power for controlling the hanging portion 531.

According to FIG. 17, the support portion 531*b* may have a curved shape, and the curved shape of the support portion 531*b* may be a curved shape facing downward as it goes from the center to both ends. The support portion 531*b* around the fastening portion 531*a* may include an intake port 531*c*. The intake port 531*c* may mean a hole through which air can be sucked into the support portion 531*b*. When clothing hangs on the support portion 531*b*, it is preferable that the intake port 531*c* is not blocked. Therefore, it is preferable that the intake port 531*c* is positioned around the fastening portion 531*a*. Further, it is preferable that the intake port 531*c* is positioned on an upper surface of the support portion 531*b*.

Figure 18:
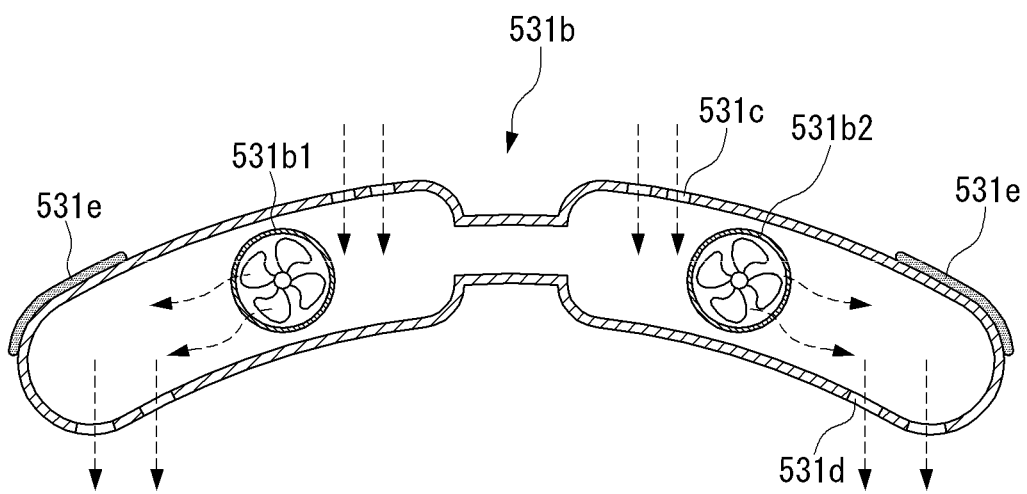
FIG. 18 illustrates a cross section of a support portion to a first embodiment of the present disclosure.

FIG. 18 illustrates a cross section of a support portion to the first embodiment of the present disclosure.

According to FIG. 18, at least one fan 531*b*1 may be included inside the support portion 531*b*. That is, the support portion 531*b* may generate a flow of air inside clothing.

According to FIG. 18, the fan 531*b*1 may be configured to discharge air from the inside to the outside of the support portion 531*b*. As the fan 531*b*1 operates inside the support portion 531*b*, air may be exhausted from an exhaust port 531*d* if air enters from the intake port 531*c*. The exhaust port 531*d* may be positioned on a lower surface of the support portion 531*b*. That is, it is preferable that a direction in which air is discharged from the exhaust port 531*d* is toward the lower part of the clothing. Further, the direction in which air is discharged may be toward cuffs of clothing depending on a position of the exhaust port 531*d*.

If air is discharged from the exhaust port 531*d* by the fan 531*b*1, the exhaust port 531*d* may introduce air from the outside of the support portion 531*b* in response to the air exhaust.

As above, air is discharged from the inside of the support portion 531*b*, and the direction of the discharged air is toward the lower part or the cuffs of the clothing. Since a flow through which air escapes downward is formed inside clothing hanging on the hanging portion 531 due to such a configuration, the inside of the clothing may be separated from each other without sticking to each other. That is, since a sufficient space is formed inside the clothing, sufficient shaking can be transferred to the clothing even if an intensity of vibration generated in the clothing by the vibration generator 530 is weak. If the sufficient shaking is transferred to the clothing, dust, etc. adhered to the surface of clothing can efficiently fall.

A pad 531*e* may be attached to upper surfaces of both ends of the support portion 531*b*. The pad 531*e* can provide a friction force so that clothing does not fall off the hanging portion 531. The pad 531*e* may include a material such as rubber with a high friction force. That is, the pad 531e may be configured to prevent clothing from falling down in the clothing management device 500.

Figure 19:
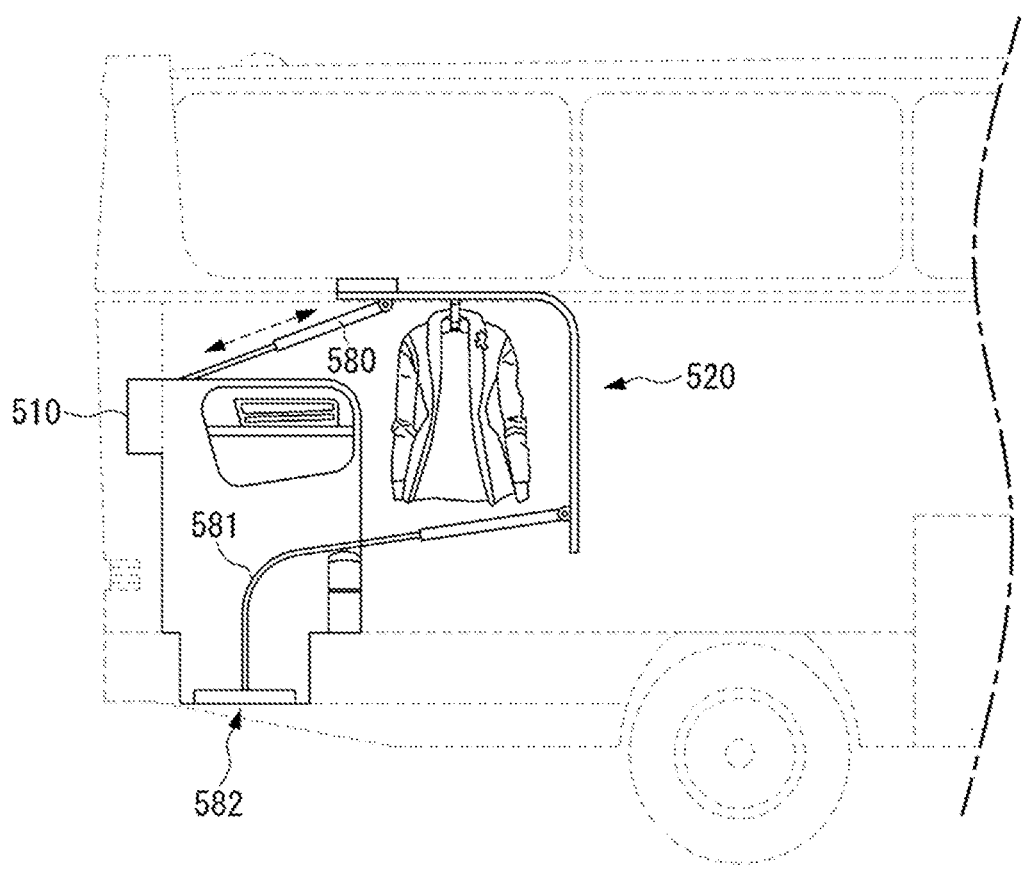
FIG. 19 illustrates a clothing management device for vehicle according to a first embodiment of the present disclosure.

FIG. 19 illustrates a clothing management device for vehicle according to the first embodiment of the present disclosure.

According to FIG. 19, the clothing management device 500 for vehicle according to the first embodiment of the present disclosure may be a device for securing more space in the limited interior of the vehicle.

According to FIG. 19, the clothing management device 500 for vehicle according to the first embodiment of the present disclosure may be installed in a trench 582 provided on the bottom of the vehicle.

That is, as the trench 582 is installed on the bottom of the vehicle, and the main body 510 is manufactured to further secure a height corresponding to a depth of the trench 582, long clothing such as coats can be managed in the vehicle. However, because the main body 510 enters up to a position lower than the bottom, the movement of the door 520 may be different from the embodiments described above. That is, the height of the main body 510 of the clothing management device 500 may be greater than the depth of the trench 582.

When the door 520 is opened, the movement may include an upward movement. When the door 520 is closed, the movement may include a downward movement. Since sufficient power is necessary for the movements, door arms 580 and 581 of the door 520 may include a hydraulic cylinder.

Thus, when the door 520 is opened, a hydraulic pressure inside the hydraulic cylinder increases, and the door 520 may move upward by the increased hydraulic pressure. Further, when the door 520 is closed, a hydraulic pressure inside the hydraulic cylinder is reduced, and the door 520 may move downward by the reduced hydraulic pressure. The door arms 580 and 581 may have a curved shape according to the directions of movements. That is, the hydraulic cylinder may provide a pressure for opening and closing the door 520.

Method for Driving Clothing Management Device for Vehicle

Based on the contents described above, a method for driving a clothing management device for vehicle according to a second embodiment of the present disclosure is described in detail below.

The description of the method for driving the clothing management device for vehicle according to the second embodiment of the present disclosure that is equivalent or identical to the first embodiment is omitted, and only a difference between them is described.

FIGS. 20 to 23 illustrate a method for driving a clothing management device for vehicle according to the second embodiment of the present disclosure.

Figure 20:
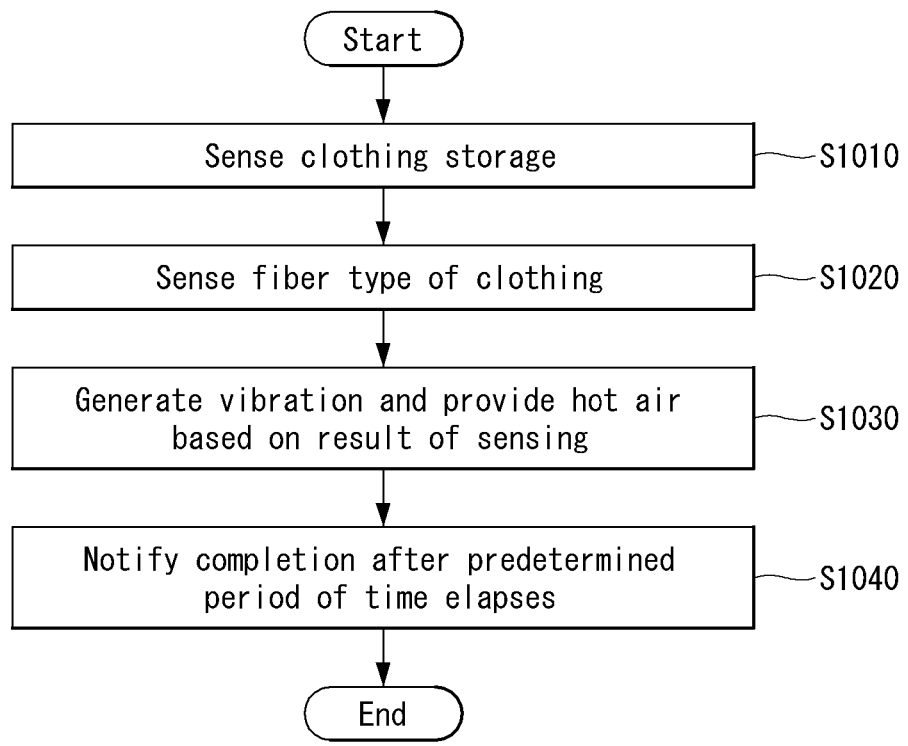
FIGS. 20 to 23 illustrate a method for driving a clothing management device for vehicle according to a second embodiment of the present disclosure.

According to FIG. 20, a method for driving a clothing management device 500 for vehicle according to the second embodiment of the present disclosure may include a step S1010 of sensing clothing storage, a step S1020 of sensing a fiber type of clothing, a step S1030 of generating a vibration and providing a hot air based on a result of sensing, and a step S1040 of stopping generating the vibration and providing the hot air after a predetermined period of time elapses and notifying a completion.

Figure 21:
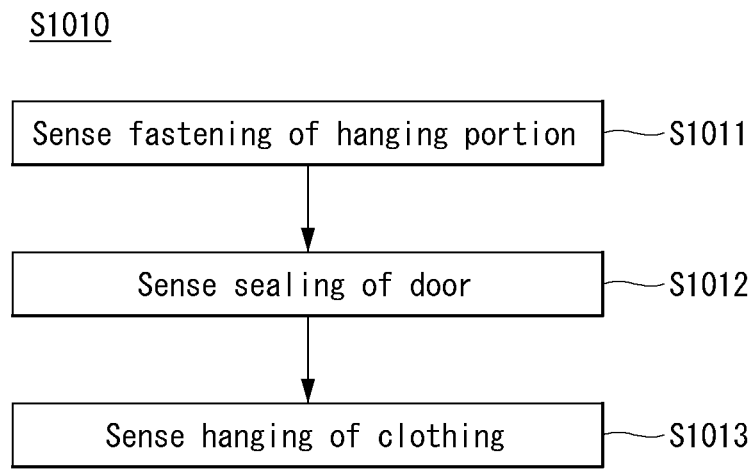

According to FIG. 21, the step S1010 of sensing the clothing storage may include a step S1011 of sensing that a hanging portion 531, on which the clothing hangs, is fastened to a door arm 528, a step S1012 of sensing that a door 520 is closed and sealed in a state in which the clothing hangs, and a step S1013 of sensing that the clothing properly hangs.

Figure 22:
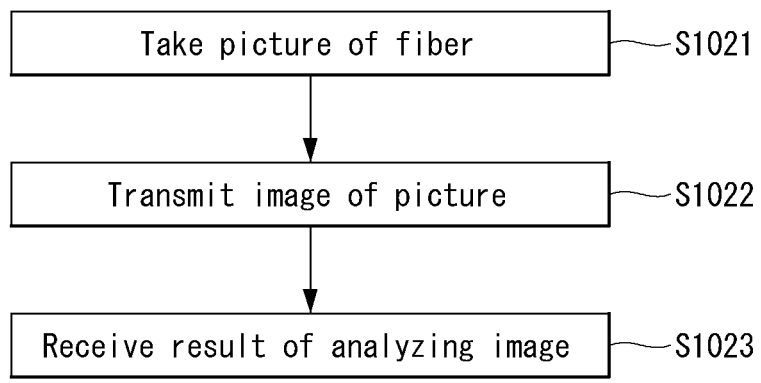

According to FIG. 22, the step S1020 of sensing the fiber type of clothing may include a step S1021 of taking a picture of fiber, a step S1022 of transmitting an image of the picture to an external server, and a step S1023 of receiving a result of image analyzed by the external server.

Figure 23:
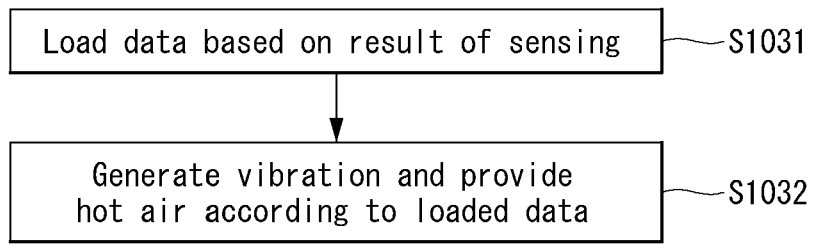

According to FIG. 23, the step S1030 of generating the vibration and providing the hot air based on the result of sensing may include a step S1031 of loading data based on the result of sensing, and a step S1032 of generating the vibration and providing the hot air according to the loaded data.

In this instance, the loaded data may include a preset value depending on the sensed fiber type. For example, if a fiber weak to heat is sensed, a hot air of low temperature may be provided. If a fragile fiber is sensed, a vibration of weak intensity may be generated.

What is claimed is:

1. A clothing management device for a vehicle comprising:
   a main body provided in the vehicle and defining a storage space configured to receive clothing;
   a door connected to the main body and configured to open and close the storage space;
   a vibration generator provided in the main body and configured to generate a vibration that is transferred to the clothing in the main body; and
   a power interface configured to transfer a power from the vehicle to the vibration generator,
   wherein the main body includes a fixed rail that is disposed at the main body and extending from an entrance of the main body, and
   wherein the door is configured to move along the fixed rail.

2. The clothing management device for vehicle of claim 1, further comprising a hanger configured to receive the clothing in the main body.

3. The clothing management device for vehicle of claim 2, wherein the door includes a door arm that is fastened to the hanger and configured to transfer, to the hanger, the vibration generated by the vibration generator.

4. The clothing management device for vehicle of claim 3, wherein the vibration generator includes:
   a vibration motor configured to generate the vibration, and
   wherein the door arm is configured to receive the vibration generated by the vibration motor.

5. The clothing management device for vehicle of claim 3,
   wherein the hanger defines (i) a fastening portion configured to be attached to and detached from the door arm and (ii) a support portion connected to the fastening portion and configured to support the clothing.

6. The clothing management device for vehicle of claim 5, wherein the fastening portion includes a magnetic material, and the support portion includes an electromagnet,
   wherein the support portion is configured to receive power from the power interface and transfer the received power to the electromagnet, and
   wherein the support portion is configured to be fastened to the fastening portion using magnetism of the electromagnet.

7. The clothing management device for vehicle of claim 5, wherein the support portion is configured to generate a flow of air inside the storage space.

8. The clothing management device for vehicle of claim 5, wherein the support portion includes:
an internal fan;
an exhaust port configured to exhaust an internal air of the support portion based on an operation of the internal fan; and
an intake port configured to introduce, to the support portion and in response to the exhaust, air from outside of the support portion.

9. The clothing management device for vehicle of claim 8, wherein the exhaust port is disposed at a lower surface of the support portion, and
wherein the exhaust port is configured to exhaust the internal air of the support portion toward a lower end of the clothing.

10. The clothing management device for vehicle of claim 1, wherein the generated vibration vibrates in a first direction.

11. The clothing management device for vehicle of claim 1, wherein the main body further includes a slider that is connected to the fixed rail and configured to move along the fixed rail,
wherein the door is connected to the slider and moves along the fixed rail.

12. The clothing management device for vehicle of claim 1, wherein the main body is installed in a trench provided at a bottom side of the vehicle.

13. The clothing management device for vehicle of claim 12, wherein a height of the main body is greater than a depth of the trench.

14. The clothing management device for vehicle of claim 13, wherein the main body includes a hydraulic cylinder that is configured to provide a pressure for opening and closing the door.

15. A clothing management device for a vehicle comprising:
a main body provided in the vehicle and defining a storage space configured to receive clothing;
a door connected to the main body and configured to open and close the storage space;
a vibration generator provided in the main body and configured to generate a vibration that is transferred to the clothing in the main body;
a power interface configured to transfer a power from the vehicle to the vibration generator; and
a hanger configured to receive the clothing in the main body,
wherein the door includes a door arm that is fastened to the hanger and configured to transfer, to the hanger, the vibration generated by the vibration generator.

16. The clothing management device for vehicle of claim 15, wherein the vibration generator includes:
a vibration motor configured to generate the vibration, and
wherein the door arm is configured to receive the vibration generated by the vibration motor.

17. The clothing management device for vehicle of claim 15,
wherein the hanger defines (i) a fastening portion configured to be attached to and detached from the door arm and (ii) a support portion connected to the fastening portion and configured to support the clothing.

18. A clothing management device for a vehicle comprising:
a main body provided in the vehicle and defining a storage space configured to receive clothing;
a door connected to the main body and configured to open and close the storage space;
a vibration generator provided in the main body and configured to generate a vibration that is transferred to the clothing in the main body; and
a power interface configured to transfer a power from the vehicle to the vibration generator,
wherein the main body is installed in a trench provided at a bottom side of the vehicle.

19. The clothing management device for vehicle of claim 18, wherein a height of the main body is greater than a depth of the trench.

20. The clothing management device for vehicle of claim 19, wherein the main body includes a hydraulic cylinder that is configured to provide a pressure for opening and closing the door.

* * * * *